US007504033B2

(12) United States Patent
Takagi et al.

(10) Patent No.: US 7,504,033 B2

(45) Date of Patent: Mar. 17, 2009

(54) WATER QUALITY PURIFICATION CARTIDGE

(75) Inventors: Toshio Takagi, Kitakyushu (JP); Fumitaka Shiratake, Kitakyushu (JP)

(73) Assignee: Kotobuki Tsushou Co., Ltd., Kitakyushu-shi (JP)

( * ) Notice: Subject to any disclaimer, the term of this patent is extended or adjusted under 35 U.S.C. 154(b) by 498 days.

(21) Appl. No.: 10/995,213

(22) Filed: Nov. 24, 2004

(65) Prior Publication Data

US 2005/0072727 A1 Apr. 7, 2005

Related U.S. Application Data

(62) Division of application No. 10/019,297, filed on May 7, 2002, now Pat. No. 7,235,176.

(51) Int. Cl.
*B01D 27/14* (2006.01)

(52) U.S. Cl. ....................... 210/295; 210/437; 210/449; 210/497.01

(58) Field of Classification Search ................. 210/282, 210/295, 437, 449, 497.01
See application file for complete search history.

(56) References Cited

U.S. PATENT DOCUMENTS

| | | | | |
|---|---|---|---|---|
| 2,334,791 A | | 11/1943 | Roffy | |
| 4,107,046 A | * | 8/1978 | Corder | 210/282 |
| 4,540,489 A | | 9/1985 | Barnard | |
| 5,061,367 A | * | 10/1991 | Hatch et al. | 210/137 |
| 5,064,534 A | * | 11/1991 | Busch et al. | 210/266 |
| 5,158,234 A | | 10/1992 | Magnenat et al. | |
| 5,169,528 A | | 12/1992 | Karbachsch et al. | |
| 5,252,206 A | | 10/1993 | Gonzalez | |
| 5,823,229 A | | 10/1998 | Bertrand et al. | |
| 5,858,215 A | | 1/1999 | Burchard et al. | |
| 6,093,313 A | | 7/2000 | Bovaird et al. | |
| 6,179,130 B1 | | 1/2001 | Nguyen et al. | |
| 6,368,503 B1 | | 4/2002 | Williamson et al. | |
| 2002/0152549 A1 | | 10/2002 | Kanaya et al. | |

FOREIGN PATENT DOCUMENTS

| | | |
|---|---|---|
| JP | 60-220183 | 11/1985 |
| JP | 62-254859 | 11/1987 |
| JP | 03-154685 | 7/1991 |
| JP | 3007614 | 11/1994 |
| JP | 7-11798 | 3/1995 |
| JP | 08-004068 | 1/1996 |
| JP | 8-009254 | 3/1996 |
| JP | 08-299855 | 11/1996 |
| JP | 09-192043 | 7/1997 |

(Continued)

OTHER PUBLICATIONS

Machine Translation of abstract, drawings and detailed description sections of JP 2001-137143 (36 pages) May 2001.

*Primary Examiner*—Terry K Cecil
(74) *Attorney, Agent, or Firm*—Westerman, Hattori, Daniels & Adrian, LLP.

(57) ABSTRACT

A structure for automatic cleaning of a water quality purification cartridge includes a water quality purification cartridge having a water purification flow path and a raw water flow path. An upstream side surface of the water quality purification cartridge is cleaned by raw water flowing through the raw water flow path.

3 Claims, 35 Drawing Sheets

FOREIGN PATENT DOCUMENTS

| | | |
|---|---|---|
| JP | 09-299832 | 11/1997 |
| JP | 2564625 | 11/1997 |
| JP | 10-043079 | 2/1998 |
| JP | 2572801 | 3/1998 |
| JP | 11-009485 | 1/1999 |
| JP | 11-113775 | 4/1999 |
| JP | 11-138055 | 5/1999 |
| JP | 11-267635 | 10/1999 |
| JP | 11-309450 | 11/1999 |
| JP | 11-333328 | 12/1999 |
| JP | 2000-116561 | 4/2000 |
| JP | 2001-137143 | 5/2001 |
| JP | 2001-162270 | 6/2001 |
| JP | 2001-212018 | 8/2001 |
| JP | 2002-018209 | 1/2002 |
| JP | 2002-106006 | 4/2002 |
| JP | 2002-115292 | 4/2002 |
| JP | 2002-346552 | 12/2002 |
| JP | 2002-348924 | 12/2002 |
| WO | WO 01/56445 | 8/2001 |

* cited by examiner (A)

(B)

WATER QUALITY PURIFICATION CARTRIDGE

This application is a divisional of application Ser. No. 10/019,297, filed May 7, 2002 now U.S. Pat. No. 7,235,176.

FIELD OF THE INVENTION

The present invention relates to a shower head with water purification function, used in a kitchen, cook room, toilet or bathroom, and having an ability of purifying water and/or hot water discharged at the time of use.

BACKGROUND ART

As a shower head having an ability of purifying water and/or hot water, attached to a washstand or a shower used in a toilet or a bathroom, there has been heretofore used a chlorine removing shower head described in, for example, Japanese Registered Utility Model Publication No. 3007614.

This chlorine removing shower head has a water quality purification cartridge for purifying the water quality, and a switching valve for switching water and/or hot water discharged from the shower between purified water and raw water, housed therein.

[Problem]

In such a conventional chlorine removing shower head, the switching valve housed in the shower head body is arranged on the upstream side of the position where the water quality purification cartridge is housed. Therefore, with the one in which the water quality purification cartridge is housed in the body, the storage capacity of the switching valve becomes small, and the switching valve must be formed small corresponding to the storage section. As a result, the shape and the structure are also restricted. The production becomes also difficult. With the one having the water quality purification cartridge housed in the head part, the head part becomes heavy compared to the body, thereby the weight balance of the shower head becomes bad, making it hard to use.

DISCLOSURE OF THE INVENTION

The present invention is for solving the above problems in the related art, and it is an object of the present invention to provide a shower head with water purification function, which can be formed in a well-balanced shape and structure in view of handling, while substantially easing the restrictions on the shape, the structure and the storage capacity of the switching valve.

As means specifically constructed so as to effectively solve the above problems, a shower head with water purification function according to a first aspect of the present invention is a shower head comprising a holding part formed so as to have a connection terminal with other parts and be held directly by hand, and a head part having a shower delivery port integrally formed at the tip of the holding part, wherein in the holding part, a water quality purification cartridge is incorporated, and by the incorporation of the water quality purification cartridge, a water purification flow path penetrating the water quality purification cartridge, and a raw water flow path which does not penetrate the water quality purification cartridge are formed; in the head part, a flow path switching valve which switches between the water purification flow path and the raw water flow path is incorporated, a straight delivery port is also provided at a place where the shower delivery port is formed, and a delivery flow switching valve which switches between a delivery flow from the straight delivery port and a delivery flow from the shower delivery port is incorporated; and the flow path switching valve and the delivery flow switching valve are formed controllably from the outside of said head part independently of each other.

By the shower head with water purification function according to the first aspect, the restriction on the flow path switching valve for switching the water quality can be extended to the range that can be incorporated in the head part. Thereby, the restriction on the size can be considerably eased compared to the related art. Since the operation of the flow path switching valve becomes possible by only the head part side, the operability is improved. Moreover, the weight distribution between the head part and the holding part can be made well-balanced in view of handling of the shower head, and as a result, the shower head can be formed in a shape and structure that can be easily handled.

A shower head with water purification function according to a second aspect is characterized in that the water purification flow path and the raw water flow path formed by the incorporation of the water quality purification cartridge are formed such that a flow path on the outer periphery of the water quality purification cartridge is formed as a part of the raw water flow path, and a flow path from this outer peripheral flow path to a central space formed in the central part thereof via a water quality purification material provided in the water quality purification cartridge is formed as a part of the water purification flow path.

By the shower head with water purification function according to the second aspect, the construction of the flow path can be made simple and compact, and the structure of the holding part becomes simple and the contents of the water quality purification material can be stored in a larger amount. Also, the flow path on the outer peripheral side (upstream side) of the purification material becomes a common flow path for the raw water and the purified water. Hence, solid substance accumulated at the time of discharging the purified water, which may cause clogging, can be flushed at the time of discharging the raw water, thereby making the water quality purification cartridge hard to be clogged, and the life thereof can be extended.

A shower head with water purification function according to a third aspect is characterized in that the water purification flow path and the raw water flow path formed by the incorporation of the water quality purification cartridge are formed such that a central space of the water quality purification cartridge is formed as a part of the raw water flow path, and a flow path from this central space to an outer peripheral flow path via a water quality purification material provided in the water quality purification cartridge is formed as a part of the water purification flow path.

By the shower head with water purification function according to the third aspect, the construction of the flow path can be made simple and compact, and the structure of the holding part and the water quality purification cartridge becomes simpler and the contents of the water quality purification material can be stored in a larger amount. Also, the flow path on the central side (upstream side) of the purification material becomes a common flow path for the raw water and the purified water. Hence, solid substance accumulated at the time of discharging the purified water, which may cause clogging, can be easily flushed at the time of discharging the raw water, thereby making the water quality purification cartridge hard to be clogged, and the life thereof can be made long.

A shower head with water purification function according to a fourth aspect is characterized in that the flow path switching valve is arranged on the downstream side of the water quality purification cartridge.

By the shower head with water purification function according to the fourth aspect, the water quality purification cartridge is built in the holding part, and the flow path switching valve is incorporated in the head part. Hence, the weight distribution is well-balanced in view of handling, and the flow path can be formed in the simplest construction, thereby enabling realization of a shower head with water purification function that is lightweight and cheap.

A shower head with water purification function according to a fifth aspect is characterized in that the flow path switching valve is arranged on the upstream side of the water quality purification cartridge.

By the shower head with water purification function according to the fifth aspect, the flow path switching valve for switching the water quality can be formed operational on the head part side, and hence replacement of the water quality purification cartridge can be performed easily, and a shower head with water purification function that is lightweight and cheap, having good operability can be realized, without hardly changing the appearance.

A shower head with water purification function according to a sixth aspect is characterized in that an operating part of the flow path switching valve is incorporated in the head part, and an operation end of the operating part is made to protrude outwards of the head part.

By the shower head with water purification function according to the sixth aspect, the operation end of the operating part protruding from the head part of the shower head can be operated to switch between the purified mixed water and non-purified mixed water. Hence, the operability of switching the flow path is improved, thereby improving user-friendliness of the shower head.

A shower head with water purification function according to a seventh aspect is characterized in that the flow path switching valve is formed as an alternately switching cutoff valve having a water purification cutoff valve and a raw water cutoff valve arranged side by side, such that a push button is formed as the operation end of the operating part, and the flow path is alternately cut off by this push button.

By the shower head with water purification function according to the seventh aspect, the push button protruding from the head part can be operated to switch between the purified water and the raw water, thereby enabling realization of a shower head with water purification function having excellent operability.

A shower head with water purification function according to an eighth aspect is characterized in that the flow path switching valve is formed as an alternately switching cutoff valve having a water purification cutoff valve and a raw water cutoff valve arranged side by side, such that a control lever is formed as the operation end of the operating part, and the flow path is alternately cut off by this control lever.

By the shower head with water purification function according to the eighth aspect, the control lever protruding from the head part can be operated to switch between the purified water and the raw water, thereby enabling realization of a shower head with water purification function having excellent operability.

A shower head with water purification function according to a ninth aspect is characterized in that the water purification cutoff valve and the raw water cutoff valve of the alternately switching cutoff valve respectively comprise a spherical valving element.

By the shower head with water purification function according to the ninth aspect, at the time of closing the valve, the water pressure applied to the spherical valving element acts so as to push the spherical valving element, being a valving element, onto the valve seat, to thereby effect reliable sealing.

A shower head with water purification function according to a tenth aspect is characterized in that the delivery flow switching valve is formed as a delivery flow switching valve comprising an operating part formed so as to be able to switch the flow path from the outside of the head part.

By the shower head with water purification function according to the tenth aspect, with respect to the purified water and the raw water, the delivery condition can be selected between the shower delivery flow and the straight delivery flow, thereby enabling realization of highly convenient shower head.

A shower head with water purification function according to an an eleventh aspect is characterized in that the delivery flow switching valve is formed as a cutoff valve operated by a lever and comprising a control lever operated from the outside of the head part, as the operating part.

By the shower head with water purification function according to the eleventh aspect, the operation lever can be operated easily by a fingertip, and the delivery flow condition can be easily selected between the shower delivery flow and the straight delivery flow, thereby improving the convenience of the shower head.

A shower head with water purification function according to a twelveth aspect is characterized in that the delivery flow switching valve is formed as a delivery flow switching valve comprising a rotary operating part which operates the delivery port from the outside of the head part, as the operating part.

By the shower head with water purification function according to the twelveth aspect, there is no largely protruding member such as a lever, hence a head part easily operable can be formed, while being simplified in view of the appearance.

A shower head with water purification function according to a thirteenth aspect is characterized in that a germicidal ceramic and/or a sintered magnetic body is installed in the flow path from the water quality purification material to the delivery flow switching valve.

By the shower head with water purification function according to the thirteenth aspect, water quality purification is performed by means of the synergistic effect of the germicidal ceramic and the sintered magnetic body, in addition to the water quality purification action by means of the water quality purification material in the water quality purification cartridge, thereby the water quality can be purified more effectively.

A shower head with water purification function according to a fourteenth aspect is characterized in that a germicidal ceramic and/or a sintered magnetic body is installed in the flow path from the flow path switching valve to the delivery flow switching valve.

By the shower head with water purification function according to the fourteenth aspect, while water quality purification is performed by means of the synergistic effect of the germicidal ceramic and the sintered magnetic body in the head part, various germs are prevented from entering from the delivery port side, thereby the water quality can be purified more effectively.

A shower head with water purification function according to a fifteenth aspect is characterized in that a hose connected to a faucet is connected to the connection terminal with the other parts.

By the shower head with water purification function according to the fifteenth aspect, discharge can be made in a wide area by the length of the hose, thereby enabling realization of a shower head with water purification function which can be conveniently used in the kitchen and in other washing places.

A shower head with water purification function according to a sixteenth aspect is characterized in that a delivery port of a faucet is directly connected to the connection terminal with the other parts.

By the shower head with water purification function according to the sixteenth aspect, a faucet having a shower head with water purification function can be formed.

BRIEF DESCRIPTION OR THE DRAWINGS

Figure 32:
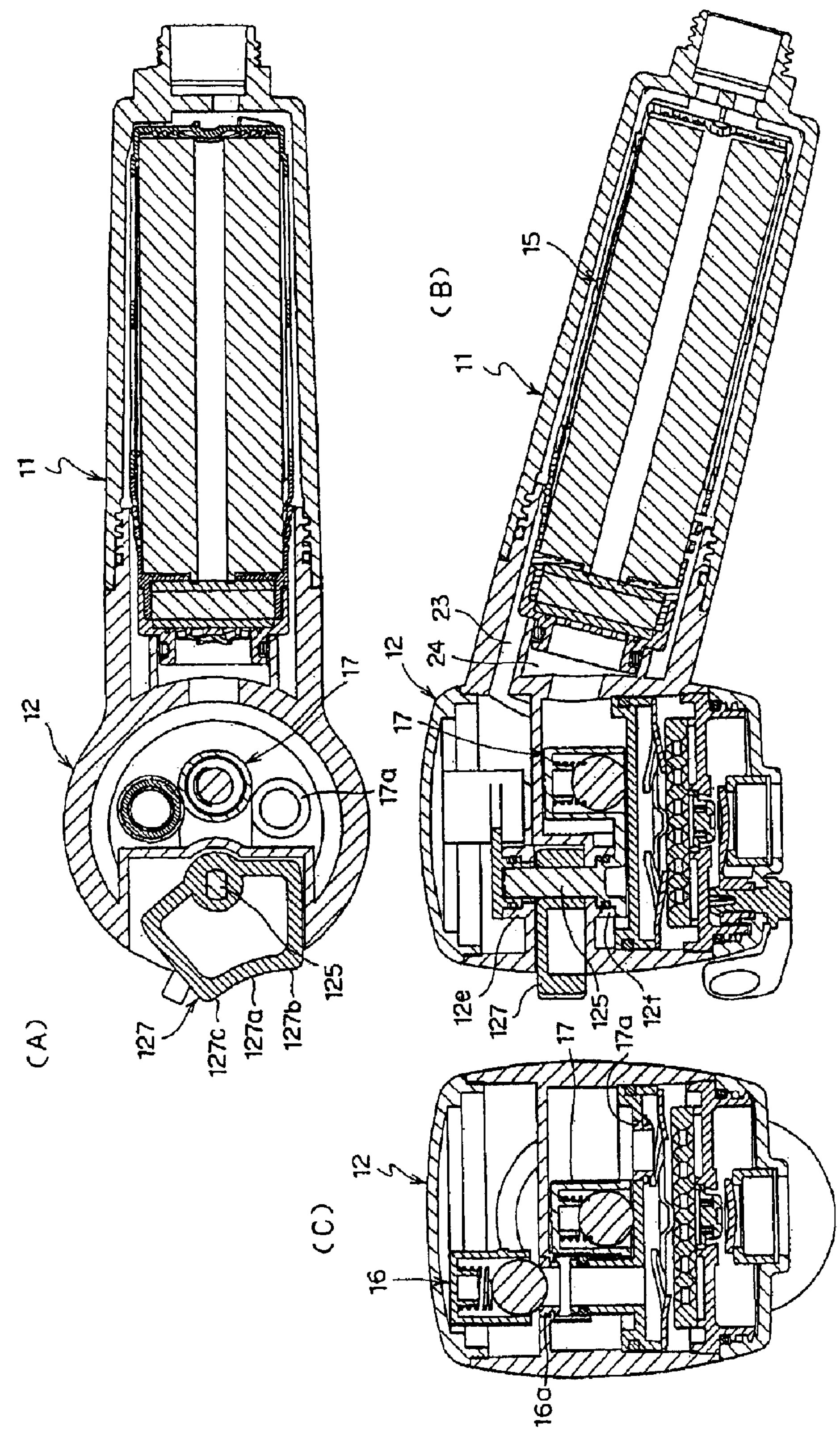
Figure 33:
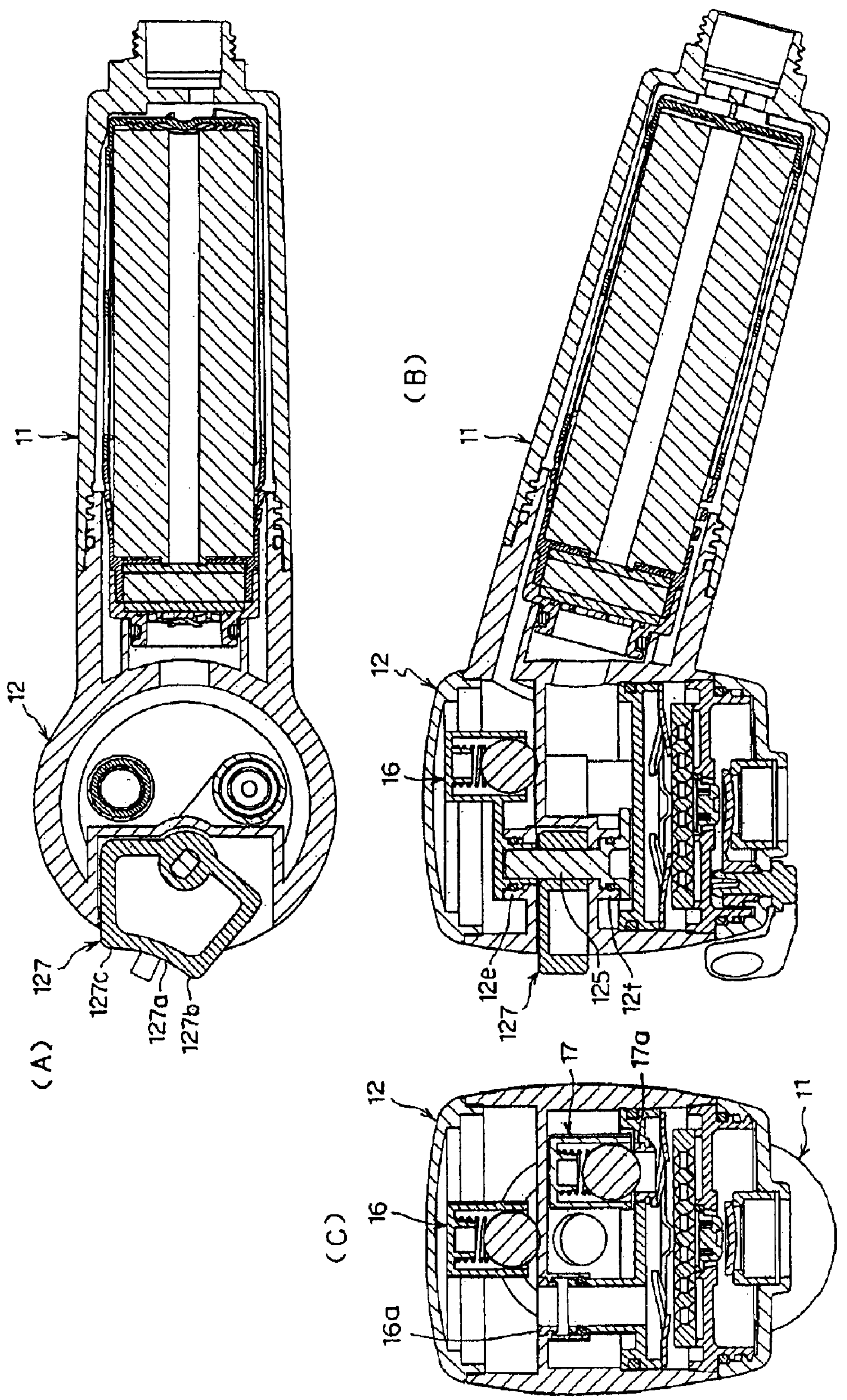
Figure 34:
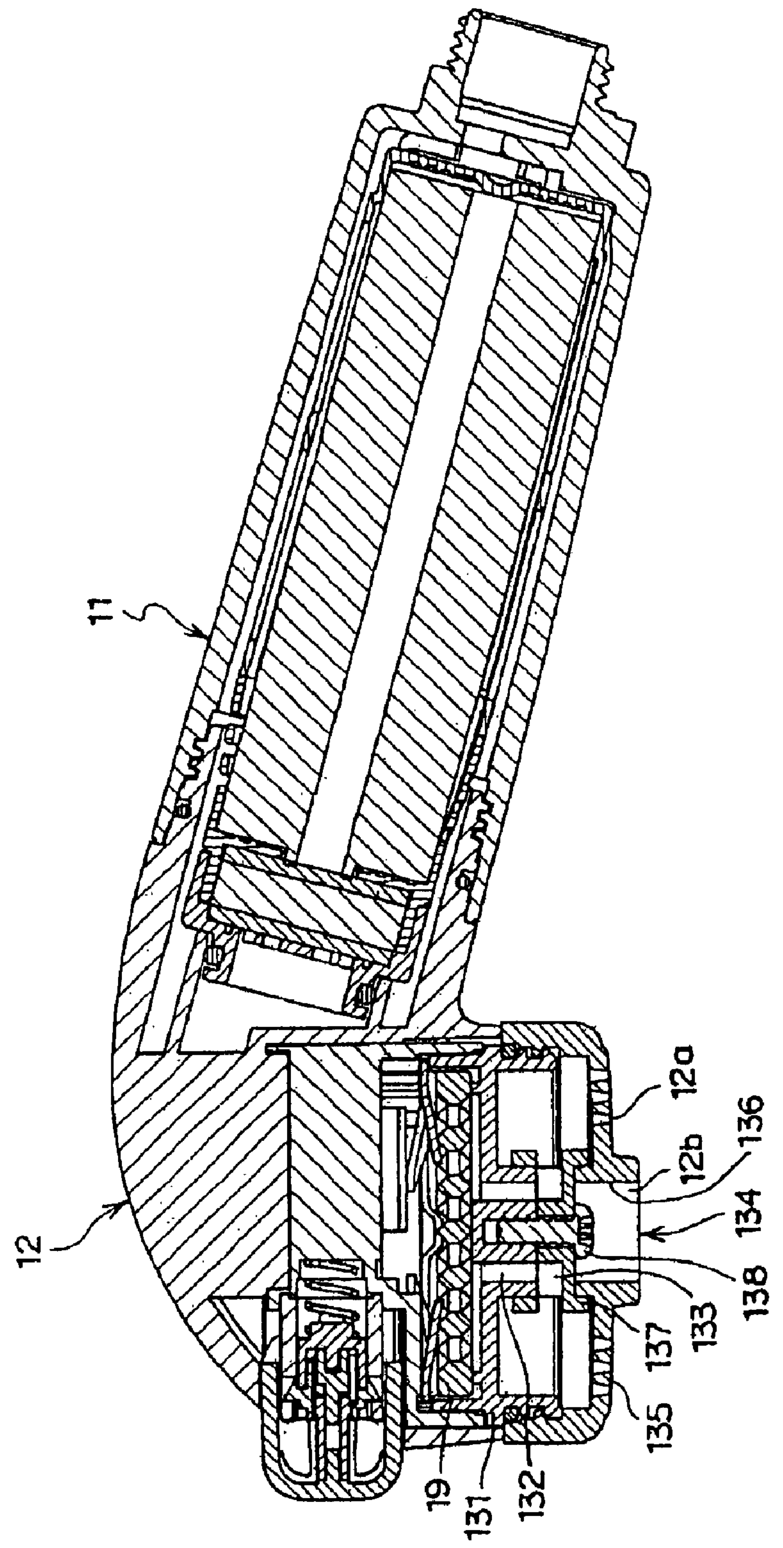
Figure 35:
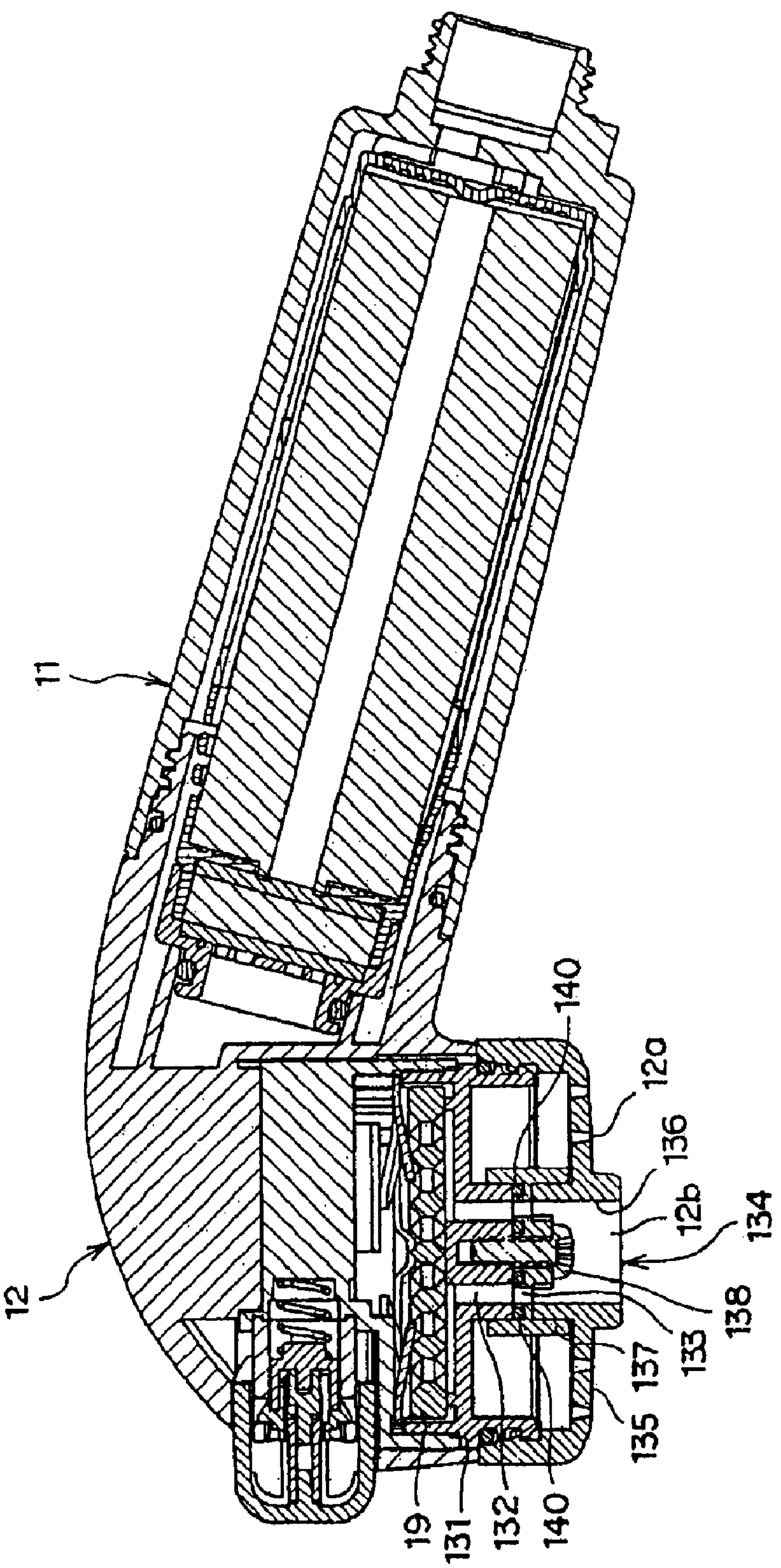
Figure 36:
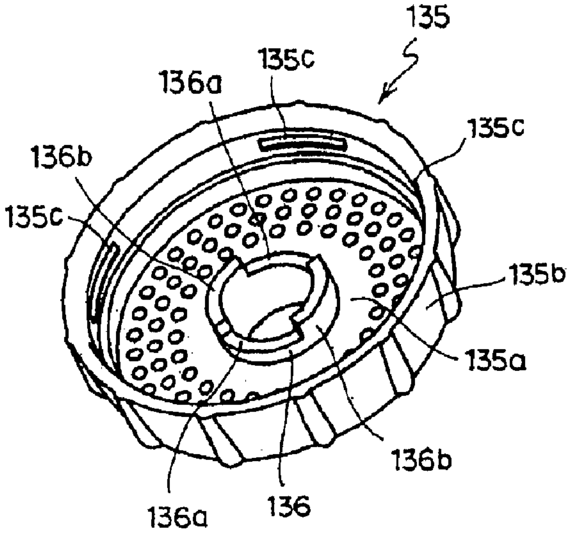
Figure 37:
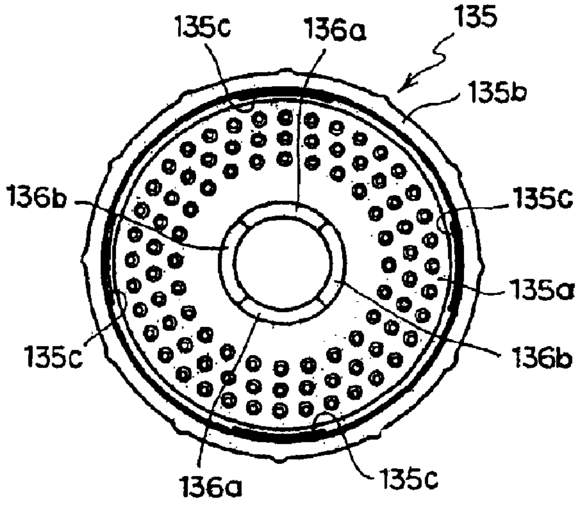
Figure 37:
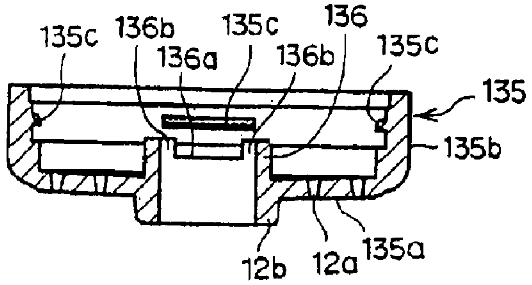
Figure 38:
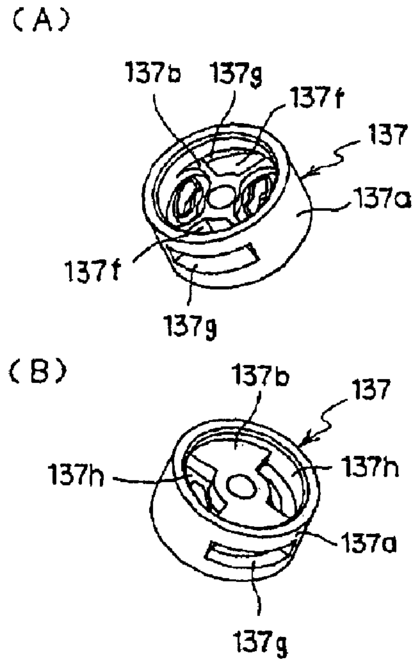
Figure 39:
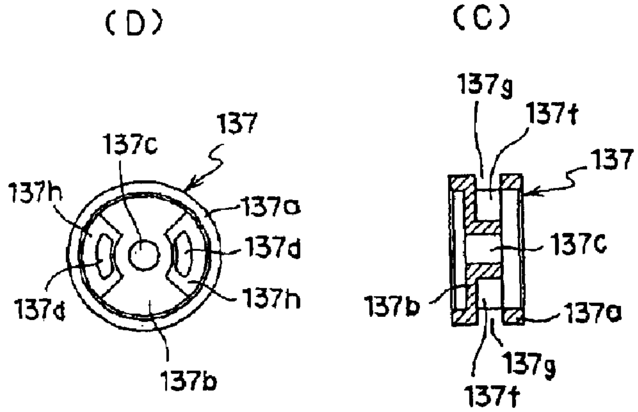
Figure 39:
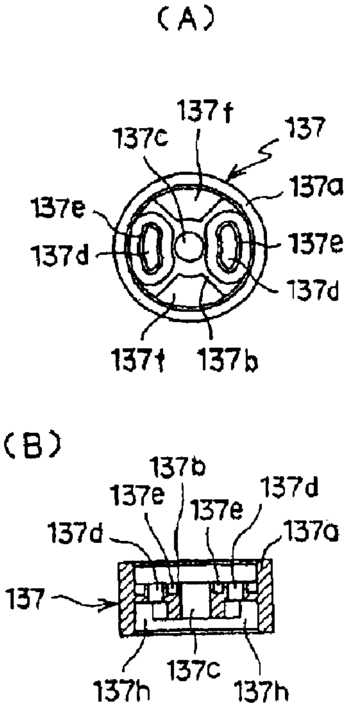
Figure 40:
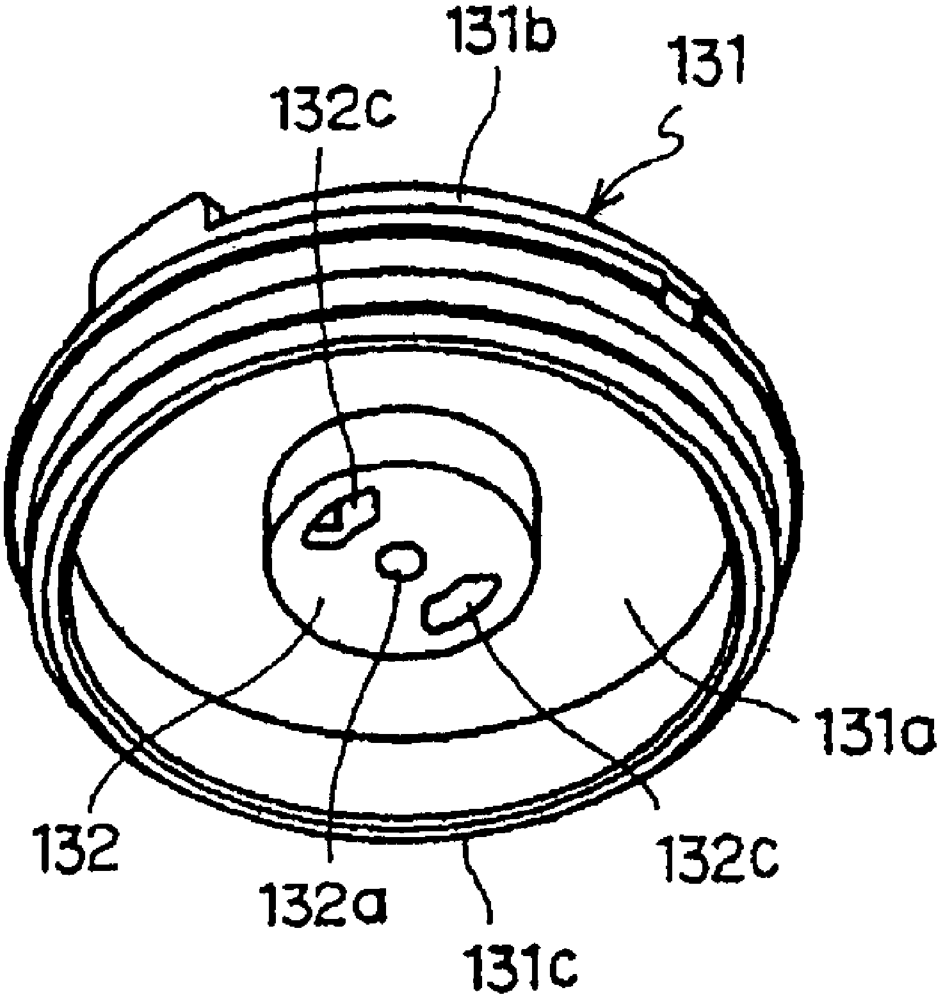
Figure 41:
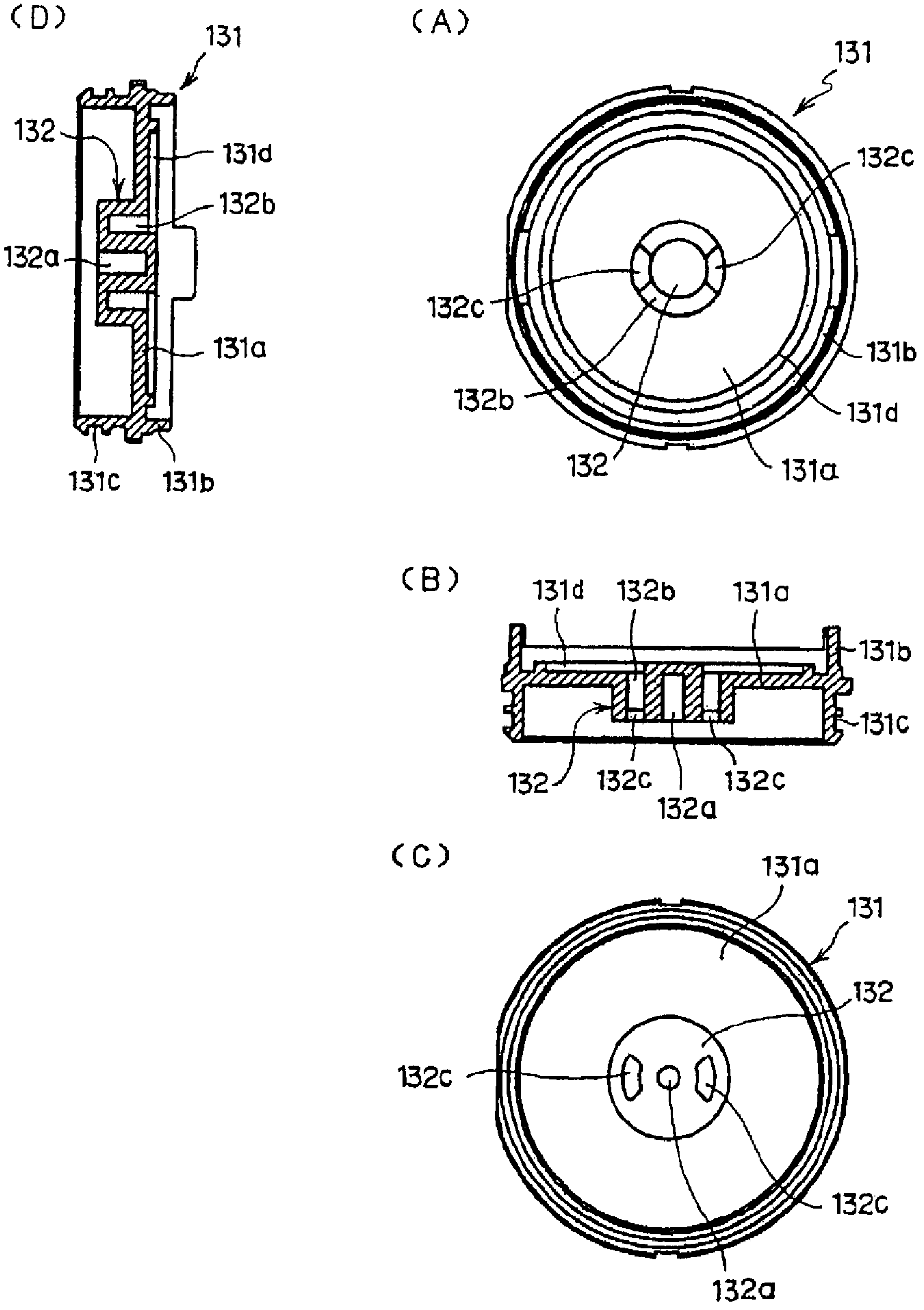
Figure 42:
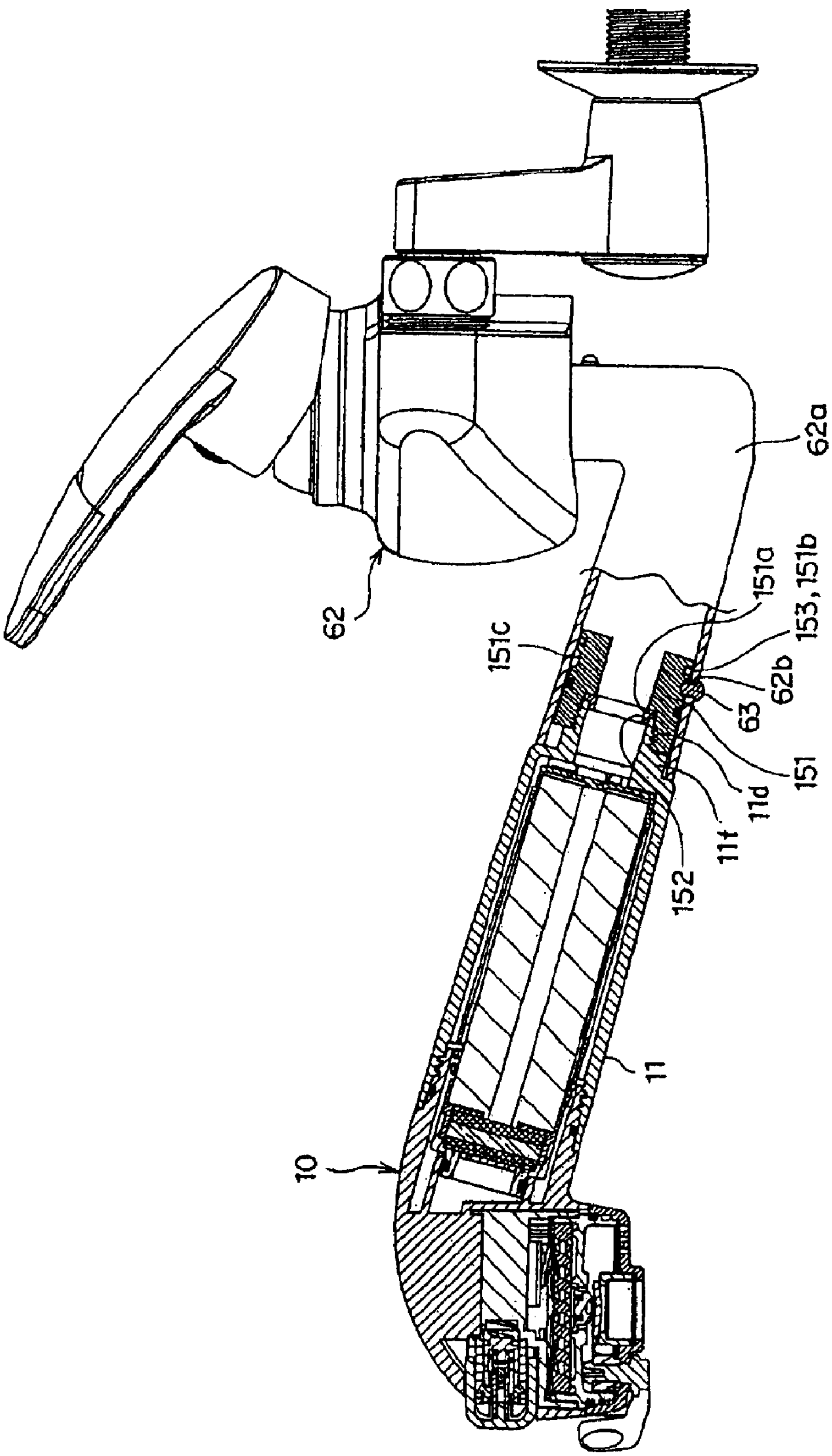
Figure 43:
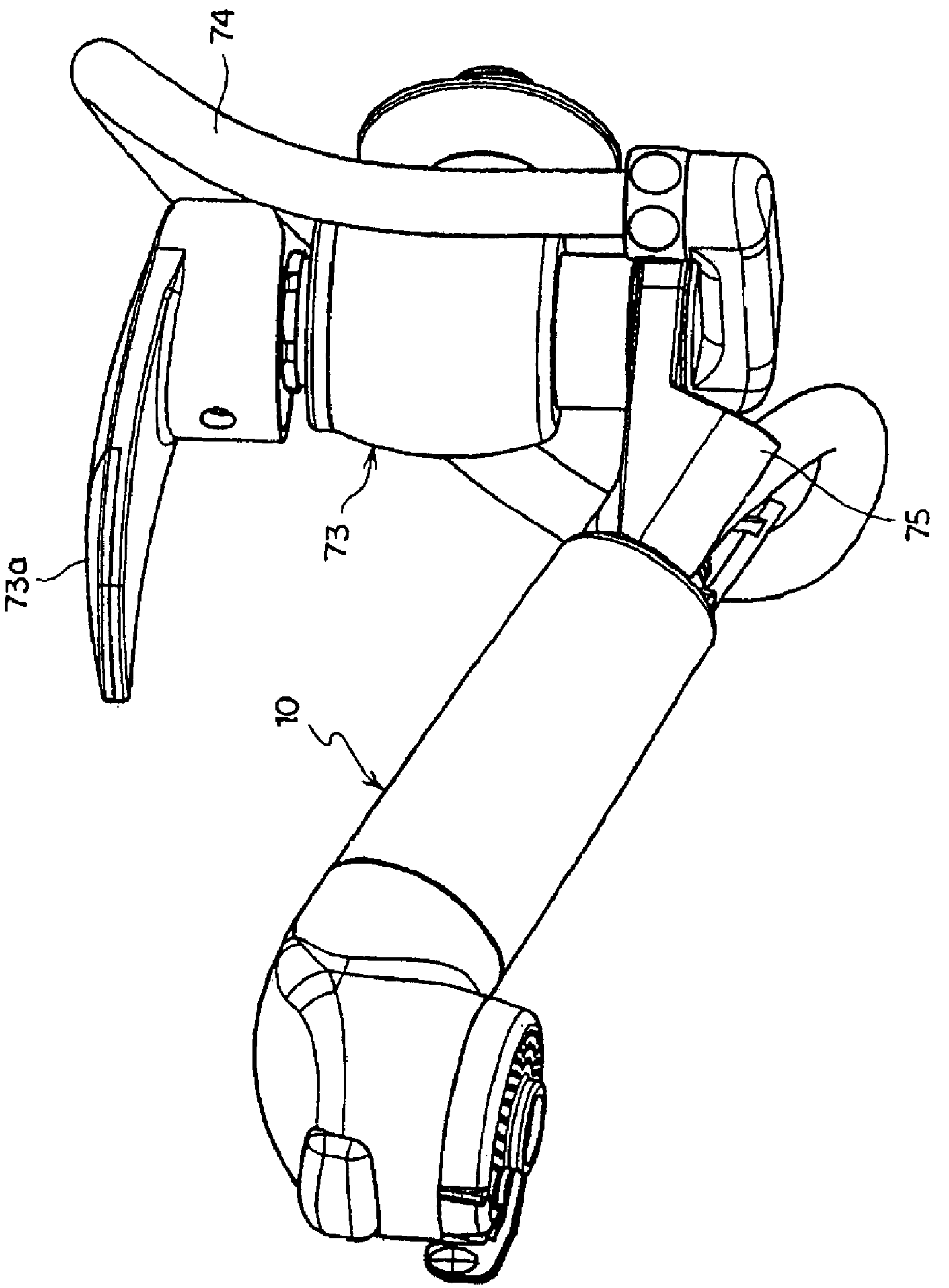

FIG. 32 is a sectional view showing the condition at the time of discharging purified water in the shower head with water purification function having a flow path switching valve operated by a seesaw type push button in an eighth other aspect of the embodiment of the present invention, (A) being a plan view in section, (B) being a sectional side view, and (C) being an frontal view in section of the head part;

FIG. 33 showing the condition at the time of discharging raw water in the shower head with water purification function in the eighth other aspect, (A) being a plan view in section, (B) being a sectional side view, and (C) being an frontal view in section of the head part;

FIG. 34 is a longitudinal sectional view showing the shower delivery state in a shower head with water purification function having a delivery flow switching valve by a rotary operation in a ninth other aspect of the embodiment of the present invention;

FIG. 35 is a longitudinal sectional view showing the straight delivery state in the shower head with water purification function in the ninth other aspect;

FIG. 36 is a perspective view showing a screen member in the shower head with water purification function in the ninth other aspect;

FIG. 37 is a parts diagram showing the screen member in the shower head with water purification function in the ninth other aspect, (A) being a plan view, (B) being a longitudinal sectional view;

FIG. 38 is a perspective view showing a flow path changing member in the shower head with water purification function in the ninth other aspect, (A) being a perspective view as seen from the upper face side, and (B) being a perspective view as seen from the lower face side;

FIG. 39 is a parts diagram showing the flow path changing member in the shower head with water purification function in the ninth other aspect, (A) being an upper plan view, (B) being a side view, (C) being a side view at a position rotated by 90 degrees from (B), and (D) being a lower plan view;

FIG. 40 is a perspective view showing a partition member in the shower head with water purification function in the ninth other aspect;

FIG. 41 is a parts diagram showing the partition member in the shower head with water purification function in the ninth other aspect, (A) being an upper plan view, (B) being a side view, (C) being a lower plan view and (D) being a side view at a position rotated by 90 degrees from (B);

FIG. 42 is a partly section side view showing a faucet direct-coupled shower head with water purification function in a tenth other aspect of the embodiment of the present invention; and FIG. 43 is a perspective view showing a shower head with water purification function connected to a single tap in an eleventh other aspect of the embodiment of the present invention.

DESCRIPTION OF THE PREFERRED EMBODIMENT

The case where a shower head with water purification function is provided at a tap installed in a kitchen will now be described as an embodiment of the present invention.

However, this embodiment is for specifically explaining the outline of the invention so as to be easily understood, and does not limit the contents of the invention, unless otherwise specified.

[Construction]

Figure 1:
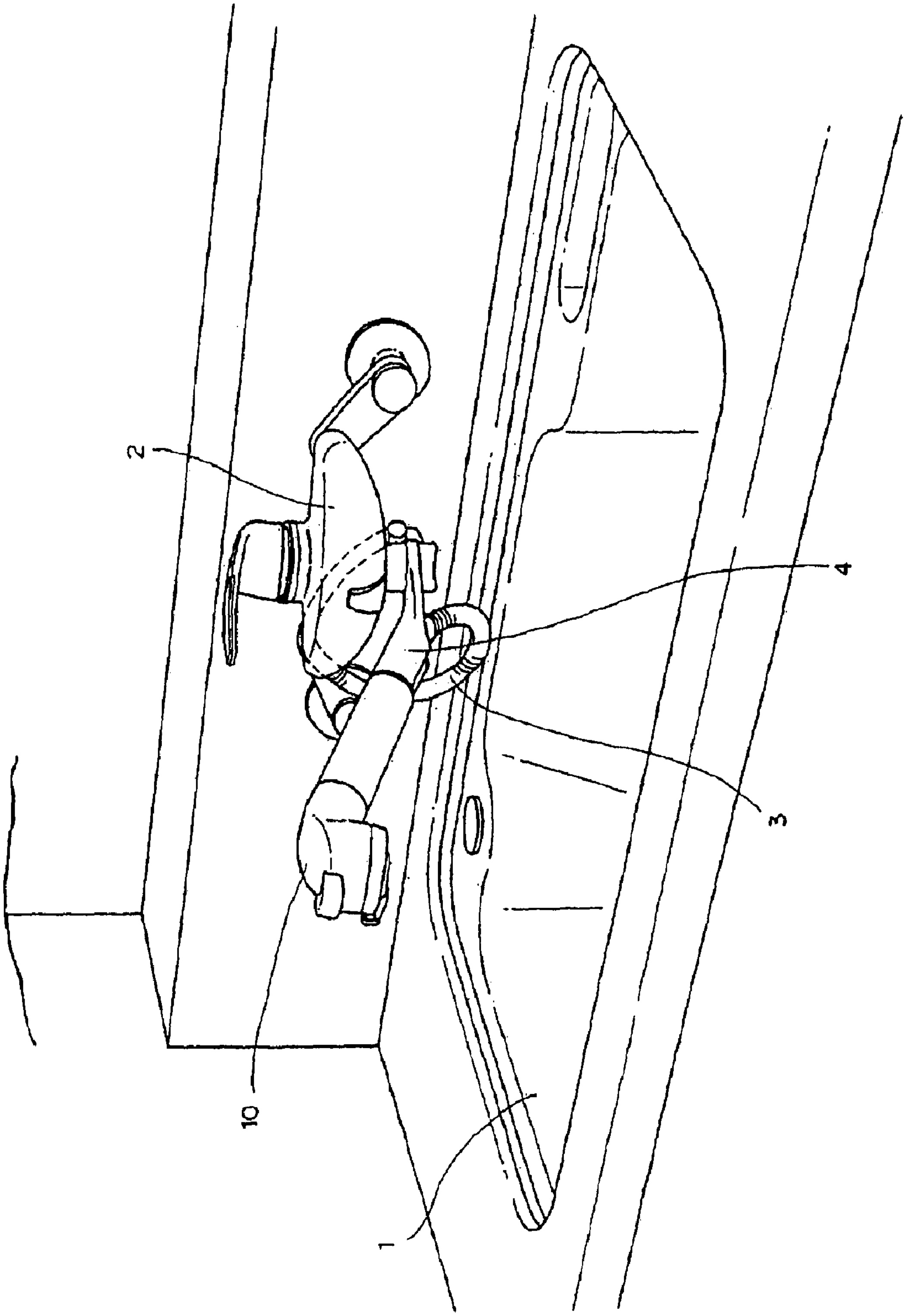
FIG. 1 is a perspective view showing a case where a shower head with water purification function according to an embodiment of the present invention is attached to combination taps in a kitchen.

In the kitchen of this embodiment, as shown in FIG. 1, a faucet of combination taps 2 which mixes hot water and water to let the water flow is arranged so that it is located above a sink, a shower head with water purification function 10 is attached to an end of a flexible hose 3 connected to this combination taps 2, and is detachably latched by a shower head support member (hereinafter referred to as a "holder section") 4 rotatably provided below the combination taps 2, to discharge water, hot water or hot water-water combined water (hereinafter, referred to simply as "combination water"), in the state with the shower head with water purification function 10 latched with the holder section 4. Moreover, from the holder section 4, the shower head with water purification function 10 is detached to pull out the hose 3, according to need, and to bend and use the hose to discharge the combination water. Thereby, the combination water can be supplied freely in the range of from the central portion of the sink 1 to the peripheral portion thereof.

Figure 2:
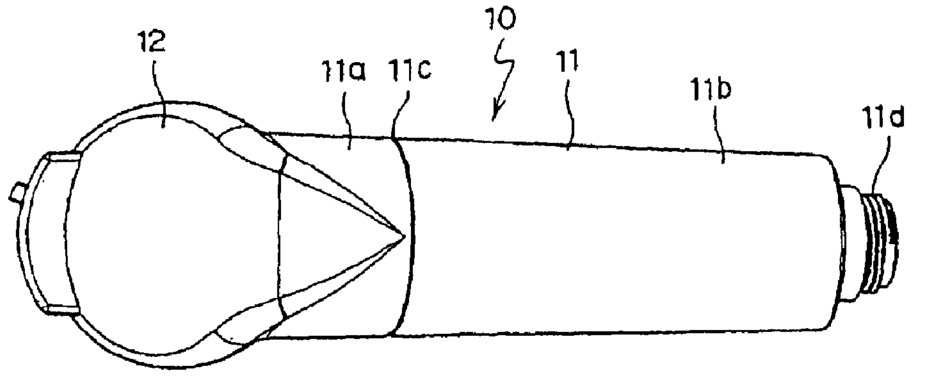
FIG. 2 is a plan view showing the appearance of the shower head with water purification function.
Figure 3:
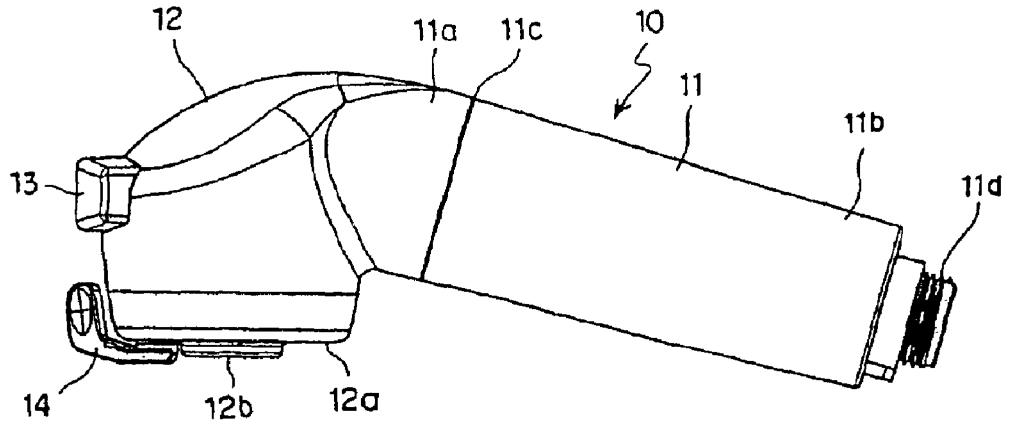
FIG. 3 is a side view showing the appearance of the shower head with water purification function.
Figure 4:
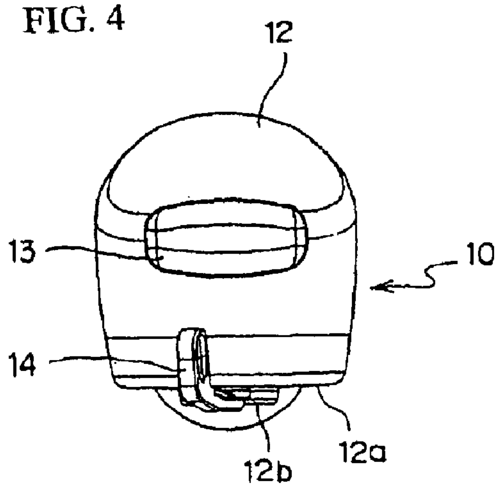
FIG. 4 is an elevation view showing the appearance of the shower head with water purification function.

The shower head with water purification function 10 used here comprises a holding part 11 having an end portion that can be attached to the hose 3 of the combination taps 2, and a head part 12 having a shower delivery port 12*a* integrally formed at the end portion opposite to the hose mounting side of the holding part 11, so that it can be used as a shower head used in the kitchen, as shown in FIG. 2 to FIG. 4.

The holding part 11 is divided at the intermediate portion into a cylinder portion 11*a* on the head part 12 side and a cylinder portion 11*b* on the hose mounting side, and is provided with a threaded portion 11*c* for junction that makes it possible to combine these two portions detachably and integrally. By releasing the screw joint of this threaded portion 11*c* for junction and separating the cylinder portion 11*a* and the cylinder portion 11*b*, a water quality purification cartridge (see FIG. 5 and FIG. 6) can be housed in the holding part 11. At the end portion of the hose mounting side, a hose connection section 11*f* in a thick cylindrical shape having a hose fixing screw 11*d* is formed to make it easy to be attached to or detached from the hose.

In the head part 12, a push button 13 for switching the flow path protrudes at the position opposite to the holding part 11 side, and a straight delivery port 12*b* is formed in the central part of the shower delivery port 12*a*. Also, a switching lever 14 for switching delivery from the straight delivery port 12*b* and delivery from the shower delivery port 12*a* is arranged so as to protrude from the lower face which forms the shower delivery port 12*a*, on the downstream side close to the position where the push button 13 is arranged.

Figure 5:
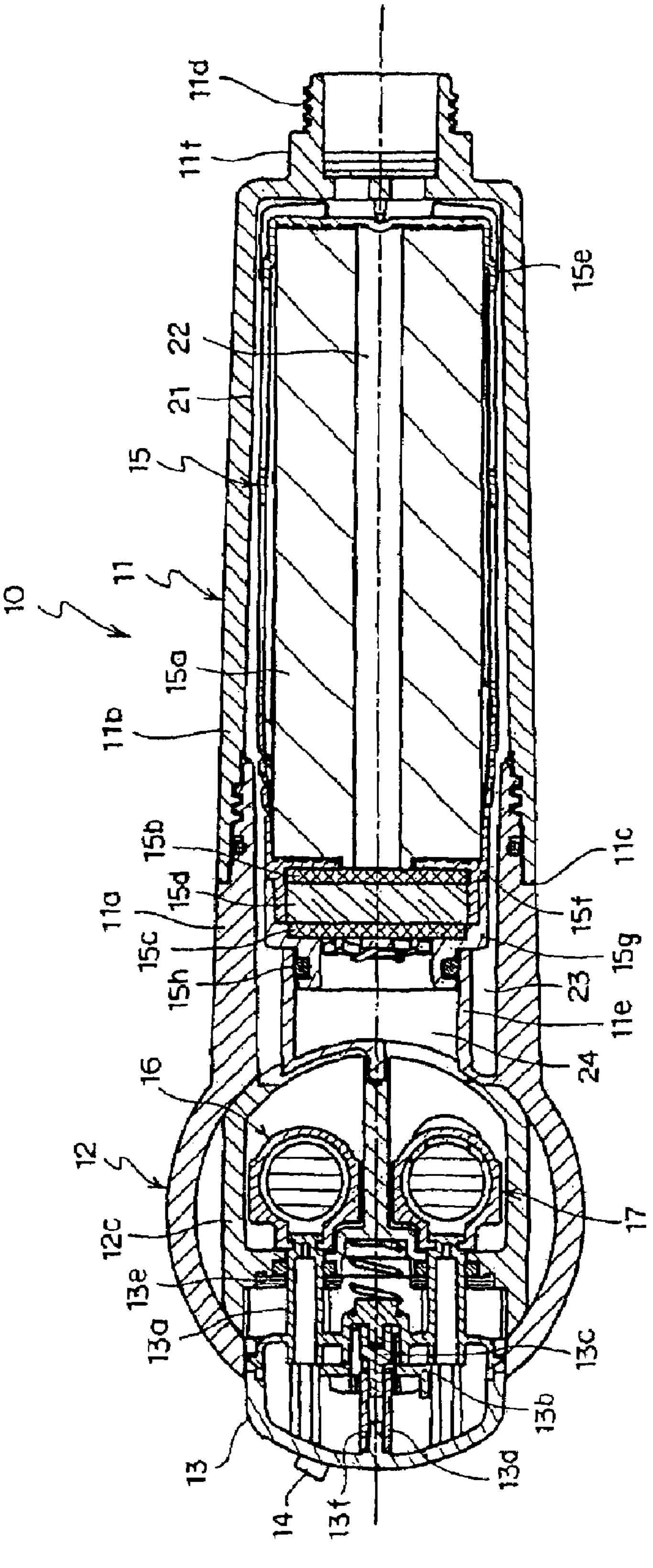
FIG. 5 is a plan view in section showing the case where a cutoff valve on the purified water side of a flow path switching valve is in an open position, in the shower head with water purification function.
Figure 6:
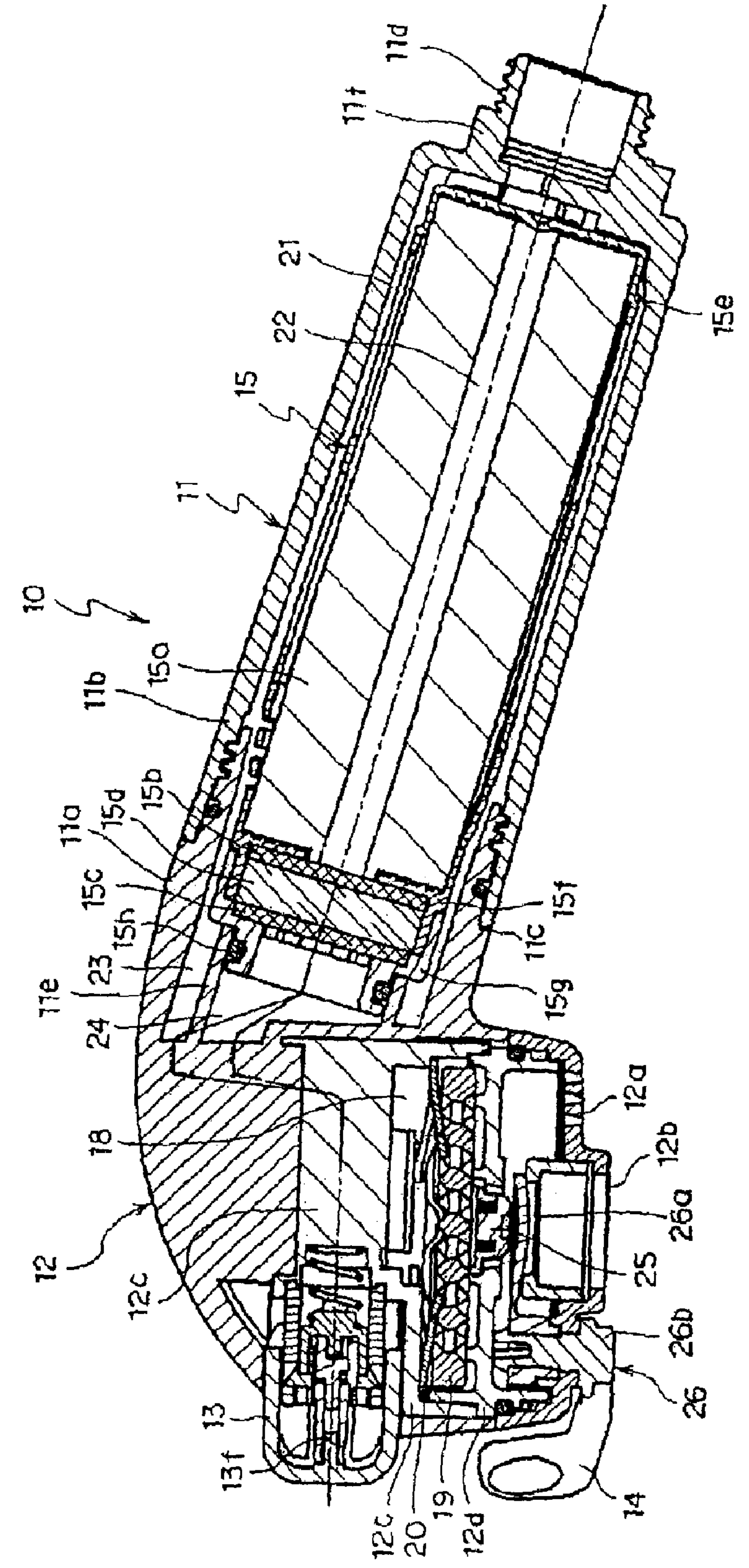
FIG. 6 is a side sectional view showing the case where the cutoff valve on the purified water side of the flow path switching valve is in the open position, in the shower head with water purification function.
Figure 7:
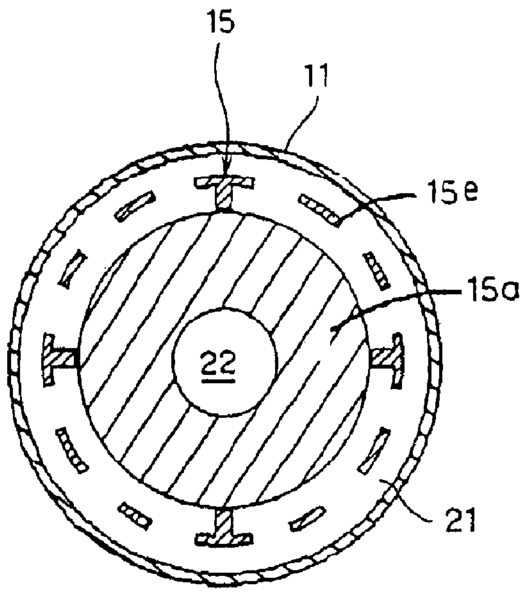
FIG. 7 is a sectional view with respect to a face vertical to the axial direction of a holding part of the shower head with water purification function.

In the shower head 10, as shown in FIG. 5 to FIG. 7, the water quality purification cartridge 15 is housed. The holding part 11 which houses this water quality purification cartridge 15 uses the outer peripheral flow path 21 of the water quality purification cartridge 15 as a part of the raw water flow path, and uses the central space 22 of the water quality purification cartridge 15 as a part of the water purification flow path. As a result, in the case of delivering purified water, the combination water flowing into the holding part 11 passes through a water quality purification material 15*a* in the water quality purification cartridge 15 from the outer peripheral flow path 21 of the water quality purification cartridge 15 to purify the water quality, and flows out to the central space 22. In the case of delivering raw water, the combination water passes through the outer peripheral flow path 21 of the water quality purification cartridge 15 and is delivered to the outside.

The water quality purification cartridge 15 stores the water quality purification material 15*a* formed in a cylindrical shape with a hole (central space 22) provided concentrically with the central axis, and a germicidal ceramic 15*d* in a granular or pellet form, clamped and arranged between non-woven fabrics 15*b* and 15*c*, respectively, on the downstream side of the germicidal ceramic 15*d*, in two spaces formed by caps 15*e*, 15*f* and 15*g* divided into three.

The water quality purification material 15*a* is stored in the space provided by the cap 15*e* formed in a cylindrical shape having a bottom and lots of slits provided on the peripheral wall, and the cap 15*f* having a water quality purification material supporting wall, which is a plane vertical with respect to the axial direction, having a hole serving as a fluid flow path drilled in the cylindrical central part, to form a fitting portion with other caps 15*e* and 15*g* at each end portion.

The germicidal ceramic 15*d* clamped between the non-woven fabrics 15*b* and 15*c* is stored in the internal space of a cylinder on a larger diameter side provided by the cap 15*g*, which connects two cylinders having a different diameter from that of the cap 15*f*, by a wall face vertical to the axial direction, and forms a fitting portion with the cap 15*f* in the cylinder having a larger diameter of the two cylinders, and forms a fitting portion with the cartridge accepting portion 11*e* (described later) provided on the head part 12 side, in the cylinder having a smaller diameter.

The water quality purification material 15*a* to be stored therein comprises activated carbon as a main component, and is hardened in a cylindrical shape, wherein when the combination water penetrates through between the outer peripheral face of this cylinder and the central hole, chemical components dissolved into the water and fine solid substances floating in the water are adsorbed or filtered.

The germicidal ceramic 15*d* is formed by adhering silver or copper to the one obtained by mixing zinc oxide, montmorillonite or the like in calcium phosphate as a base, and sintering the mixture in a granular or pellet form, which sterilizes by adsorbing harmful bacteria in the water on the surface thereof, and sterilizes or disinfects the harmful bacteria in the water by releasing metal ions, to thereby make the water quality harmless.

In the case of discharging raw water, since the combination water passes through the flow path 21 formed on the outer peripheral side of the water quality purification cartridge 15, fine solid substances, which may cause clogging in the surface of the water quality purification material, accumulated at the time of discharging the purified water is flushed by the raw water passing through the flow path 21, so that clogging unlikely occurs at the time of discharging the purified water, the purification capacity of the water quality purification material 15*a* is maintained at a high level, and the life thereof is extended. In particular, in the case of discharging hot water as the raw water, as the hot water temperature becomes higher, trihalomethane, metal ions and the like adsorbed at the time of discharging the purified water are discharged from the activated carbon, being the main component of the water quality purification material 15*a*, and can be effectively removed. As a result, the regenerative effect of the activated carbon can be increased.

In the inner end portion of the cylinder portion 11*a* on the head part 12 side of the holding part 11, the cylindrical cartridge accepting portion 11*e* for inserting and securing the tip portion of the water quality purification cartridge 15 (the end portion on the smaller diameter side of the cap 15*g*) is provided in a protruding condition.

By inserting the end portion on the smaller diameter side of the cap 15*g* of the water quality purification cartridge 15 into this cartridge accepting portion 11*e*, the position of the water quality purification cartridge 15 is fixed.

At the end portion on the smaller diameter side of the cap 15*g*, an O-ring 15*h* is provided on the periphery thereof, so that in the case where the end portion of the cap 15*g* is inserted into the cartridge accepting portion 11*e*, leakage can be prevented by the O-ring 15*h* disposed in close contact with the inner peripheral face of the cartridge accepting portion 11*e*.

Then, the flow path 23 on the outer peripheral side of the cartridge accepting portion 11*e* is communicated to the outer peripheral flow path 21 of the water quality purification cartridge 15 and is used as a part of the raw water flow path, and the flow path 24 on the inner peripheral side of the cartridge accepting portion 11*e* is communicated to the central space 22 of the water quality purification cartridge 15 via the germicidal ceramic 15*d* and is used as a part of the purified water flow path.

In the head part 12 where the push button 13 and the switching lever 14 protrude, as shown in FIG. 5, FIG. 6, and FIGS. 8 to 11, the raw water flow path (21, 23) and the water purification flow path (22, 24) are respectively communicated to an inlet (valve inlet portion) of each cutoff valve 16 and cutoff valve 17. These cutoff valves 16 and 17 serve as a flow path switching valve (water quality switching valve) operated simultaneously by the push button 13.

The outlet (downstream side) of each cutoff valve 16 and cutoff valve 17 is formed in one same space 18 (hereinafter, referred to as collecting portion), and on the downstream side of this collecting portion 18, a sintered magnetic body 19 formed in a disc shape having a plurality of small holes formed therein is arranged between a partition member 12*c* and a partition member 12*d*, so that even if the shower head 10 is swung, it does not loose stability by pressing the sintered magnetic body 19 towards the partition member 12*d* by means of a spring part 20.

This sintered magnetic body 19 is formed by providing an amorphous film layer formed of iron oxide, cobalt oxide, lithium carbonate, or the like as a main raw material, on the surface of a ferrite type base using iron oxide as a main raw material. This sintered magnetic body 19 itself has a water purification function and a sterilizing function, and accelerates release of metal ions from the germicidal ceramic and release of oxygen from montmorillonite, by the action of the magnetic force, to thereby strengthen the sterilizing effect. Also, various germs propagated inside of the activated carbon, being the main component of the water quality purification material 15*a*, are effectively sterilized or disinfected, to thereby improve the water quality.

According to the arrangement position thereof, the germicidal action is exerted even against the bacteria entering from the delivery side, to suppress propagation of various germs, to thereby make it unnecessary to discard water at the initial stage of use. Moreover, since a large sintered magnetic body 19 can be put in the head part 12, the purification function thereof can be improved, and the holding part 11 can be made to have a small diameter, and to have a diameter easy to grip, thereby it can be prevented that the holding part 11 becomes large.

On the downstream side of this sintered magnetic body 19, there is provided a collecting and transient section 25 in which the combination water having passed through small holes in the sintered magnetic body 19 is collected in the central portion, and discharged to the respective inlet portion of the shower delivery port 12*a* and the straight delivery port 12*b*. On the downstream side close to this collecting and transient section 25 with a slight gap therebetween, a cylindrically formed inlet portion of the straight delivery port 12*b* is formed, a valving element 26*a* of the delivery flow switching valve 26 is arranged between the collecting and transient section 25 and the inlet portion of the straight delivery port 12*b*, and the outer peripheral side of the inlet portion of the straight delivery port 12*b* is made to be an inlet portion of the shower delivery port 12*a*.

The delivery flow switching valve 26 comprises a valving element 26*a* formed so as to be able to freely come into and out from a gap provided between the collecting and transient section 25 and the inlet portion of the straight delivery port 12*b*, with the upper face being formed in a shallow concave, and a shaft portion 26*b* penetrating through the shower delivery port 12*a* and rotatably supported about the axis, with an attachment end of the valving element 26*a* being adhered to the end portion of the shaft portion 26*b* located inside of the shower delivery port 12*a*, and with an attachment end of the switching lever 14 being adhered to the end portion thereof located outside of the shower delivery port 12*a*.

Figure 10:
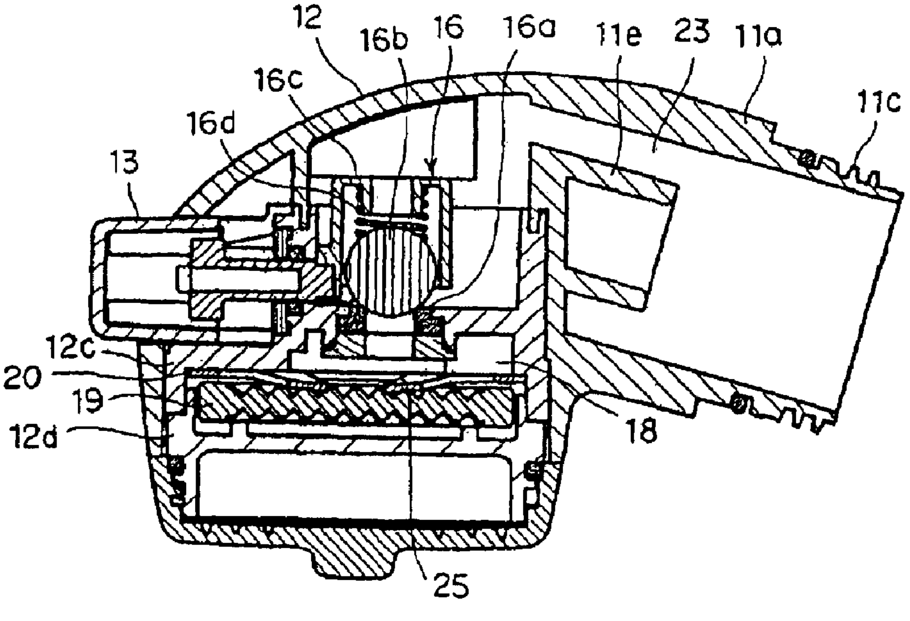
FIG. 10 is a sectional side view at a position cut along the line B-B in FIG. 8.
Figure 11:
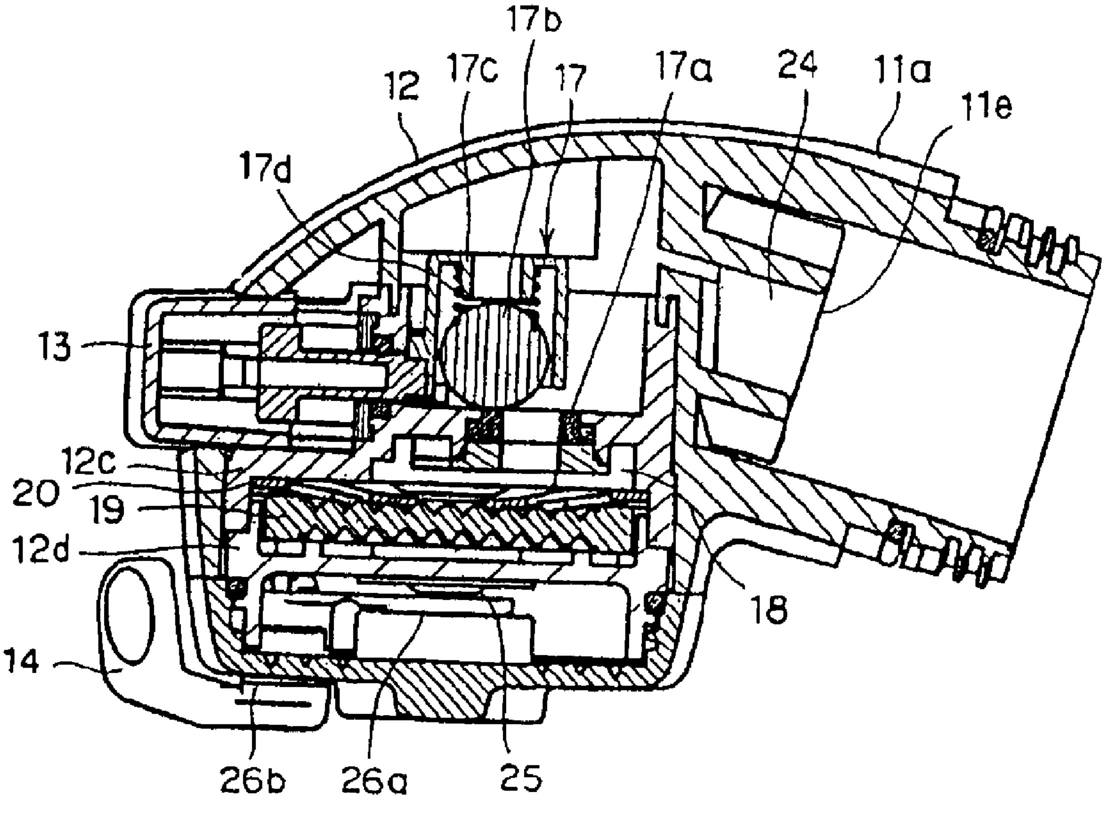
FIG. 11 is a sectional side view at a position cut along the line C-C in FIG. 8.

The cutoff valve 16 and the cutoff valve 17 are arranged in such a manner that the position thereof is respectively shifted with respect to the axial direction of the holding part 11, as shown in FIGS. 5, 10 and 11, between the cutoff valve 16 communicating with the raw water flow path (21, 23) and the cutoff valve 17 communicating with the water purification flow path (22, 24), so that either one of those valves is closed depending on the indentation of the push button 13.

As shown in FIG. 10, the cutoff valve 16 is closed in such a manner that the position of the valve seat 16*a* is determined so that the valve is closed with a shallow indentation of the push button 13, and the valve seat 16*a* is formed in an annular body, and a valving element 16*b* formed in a hard spherical shape (ball) such as a steel ball is put on a ring-shaped hole thereof from the upstream side.

In this cutoff valve 16, a box-shaped valving element supporting material 16*c* is formed, and a coil spring 16*d* and the valving element 16*b* are housed inside of the valving element supporting material 16*c*, and the valving element 16*b* is pressed towards the valve seat 16*a* by the thrust of the coil spring 16*d*.

As shown in FIG. 11, the cutoff valve 17 is closed in such a manner that the position of the valve seat 17*a* is determined so that the valve is closed with a deep indentation of the push button 13, and the valve seat 17*a* is formed in an annular body, and a valving element 17*b* formed in a hard spherical shape (ball) such as a steel ball is put on a ring-shaped hole thereof from the upstream side.

In this cutoff valve 17, a box-shaped valving element supporting material 17*c* is formed, and a coil spring 17*d* and the valving element 17*b* are housed inside of the valving element supporting material 17*c*, and the valving element 17*b* is pressed towards the valve seat 17*a* by the thrust of the coil spring 17*d*.

As shown in FIG. 10, in the case where the cutoff valve 16 stops at a position of closing the valve, since the indentation of the push button 13 is shallow, the cutoff valve 17 is in a state that the valving element 17*b* stops at an edge portion of the valve seat 17*a*, as shown in FIG. 11, and does not reach the hole portion of the valve seat 17*a* formed in an annular shape, and hence the valve 17 is in an opened state.

Figure 8:
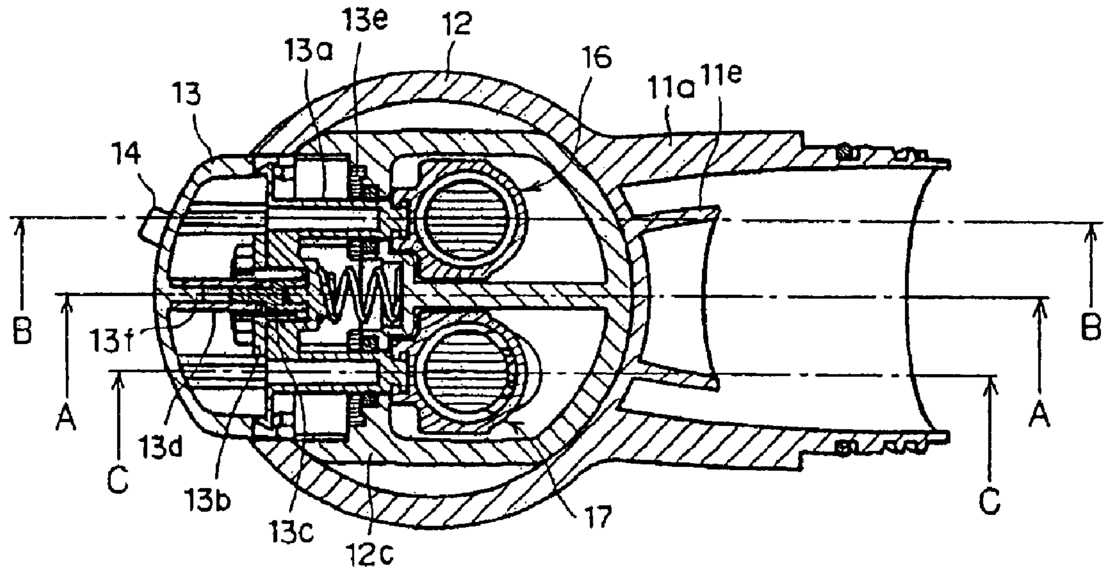
FIG. 8 is a plan view in section showing the case where the cutoff valve on the purified water side of the flow path switching valve is in the open position, in the head part of the shower head with water purification function.
Figure 9:
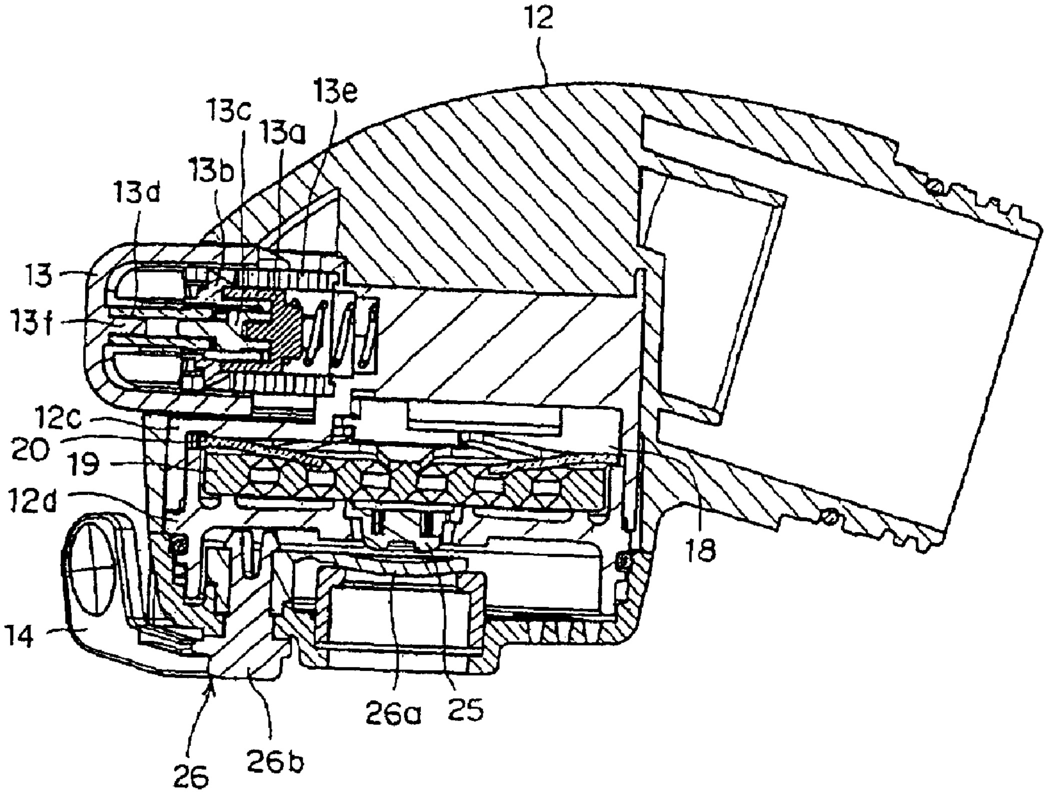
FIG. 9 is an enlarged sectional side view at a position cut along the line A-A in FIG. 8.
Figure 12:
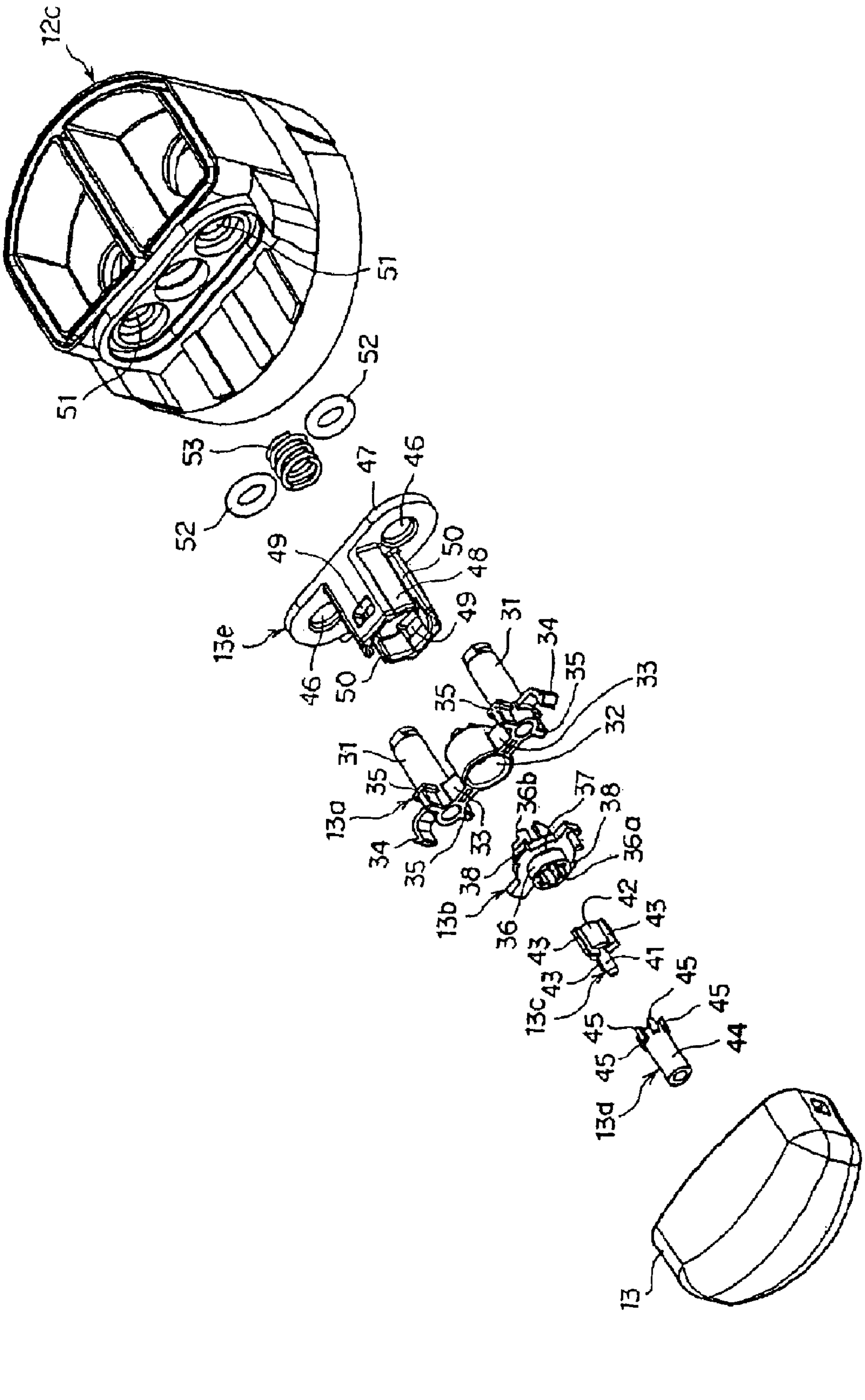
FIG. 12 is an exploded perspective view showing an operating part of the flow path switching valve in the shower head with water purification function.
Figure 13:
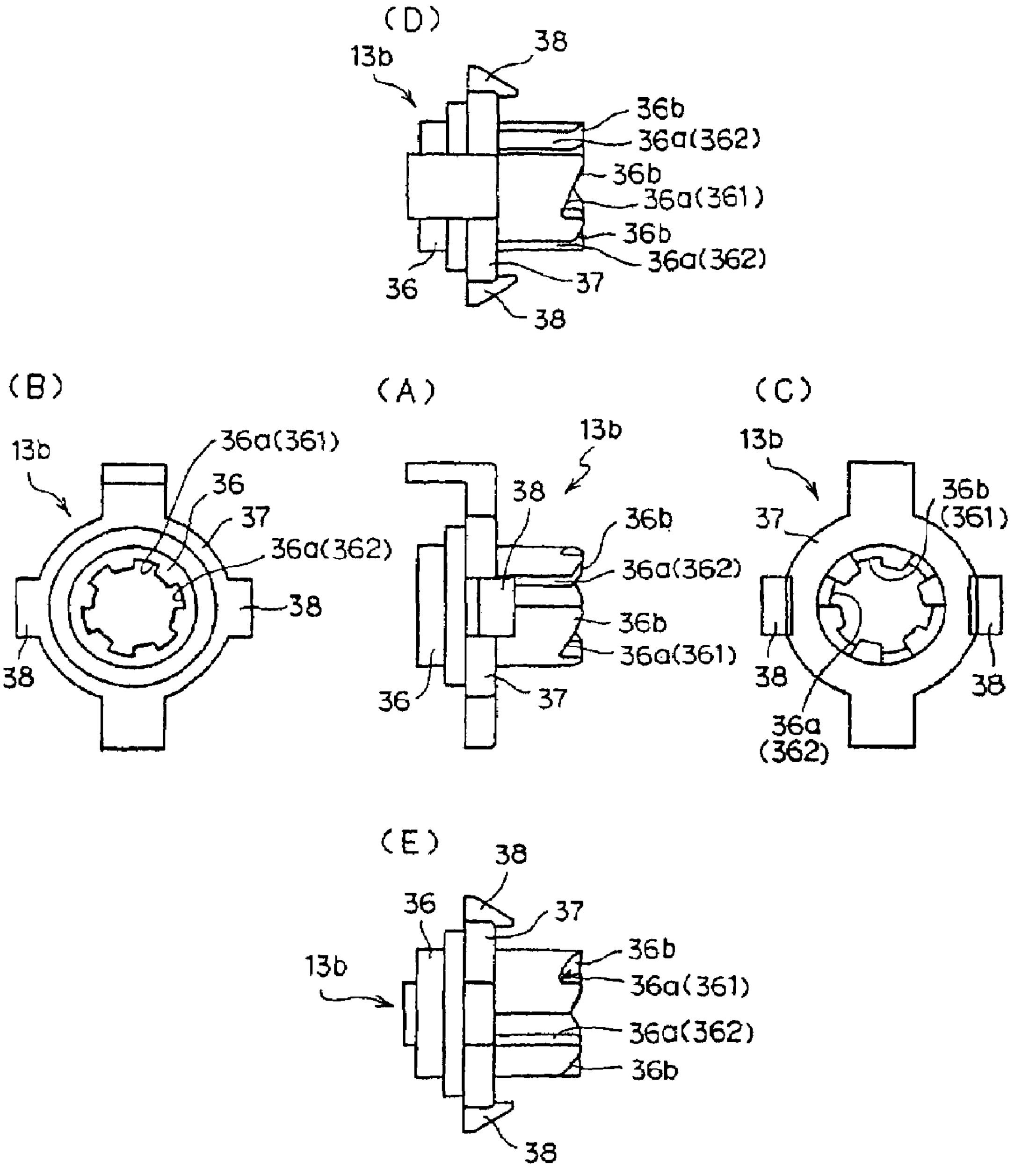
FIG. 13 is a sketch drawing showing a switching ring in the shower head with water purification function, (A) being a side view, (B) being a left frontal view, (C) being a right frontal view, (D) being an upper plan view and (E) being a lower plan view.
Figure 14:
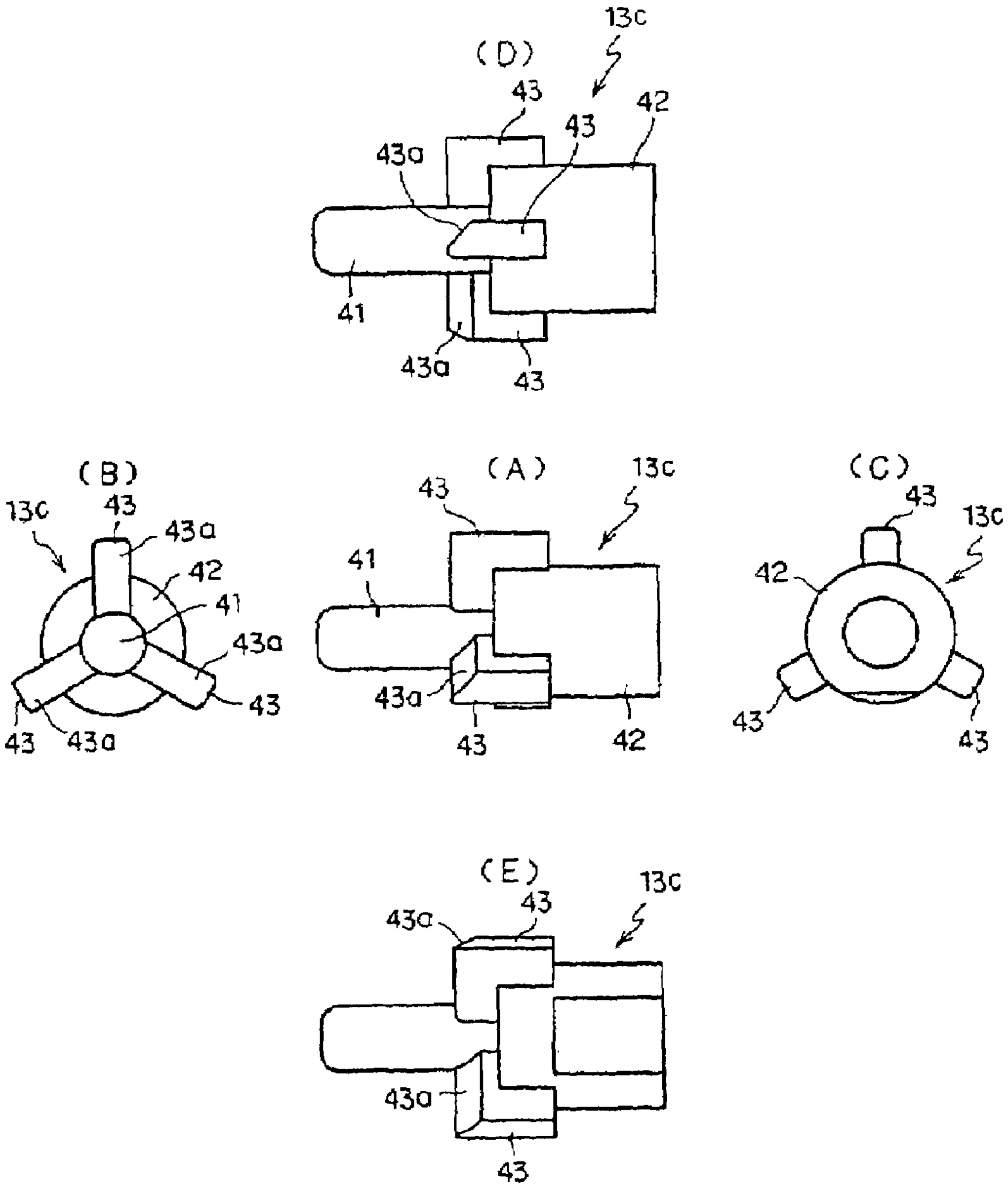
FIG. 14 is a sketch drawing showing a first switching frame in the shower head with water purification function, (A) being a side view, (B) being a left frontal view, (C) being a right frontal view, (D) being an upper plan view and (E) being a lower plan view.
Figure 15:
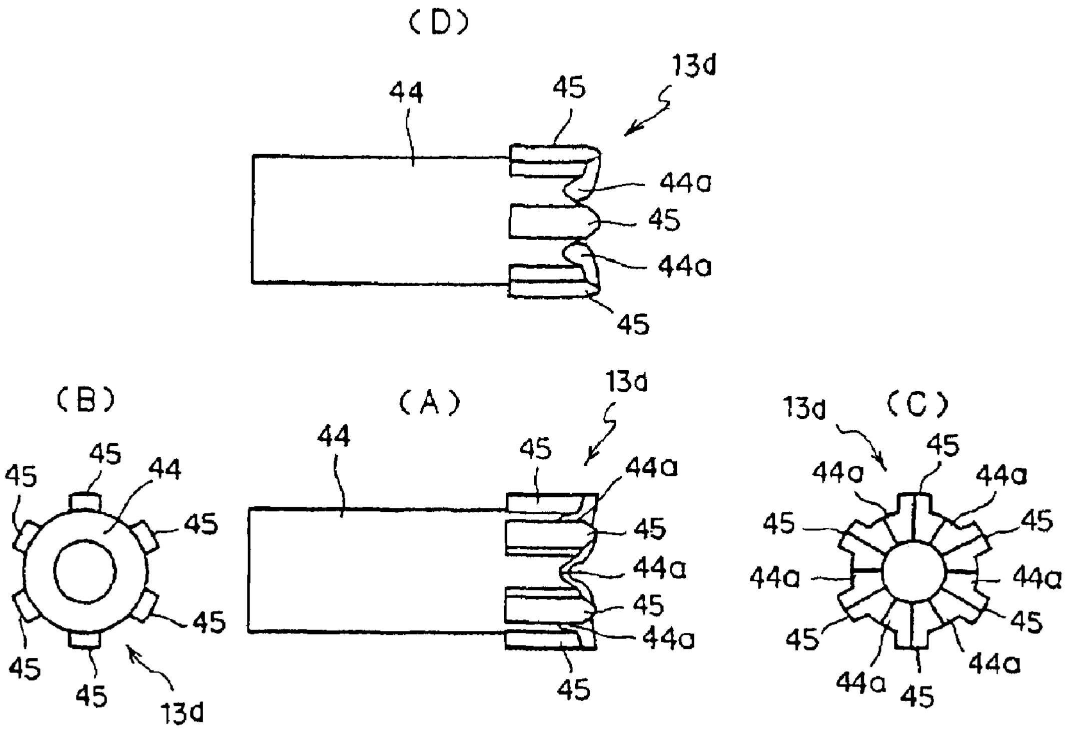
FIG. 15 is a sketch drawing showing a second switching frame in the shower head with water purification function, (A) being a side view, (B) being a left frontal view, (C) being a right frontal view and (D) being an upper plan view.
Figure 16:
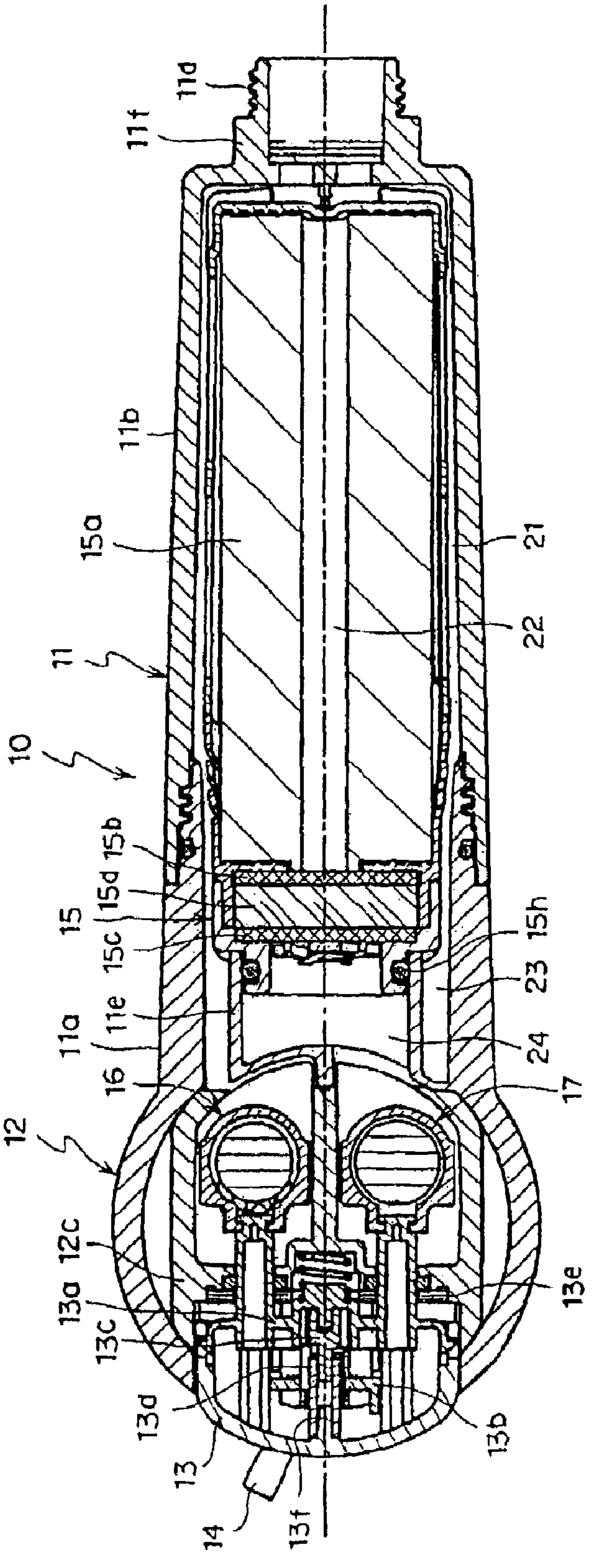
FIG. 16 is a plan view in section showing the case where a cutoff valve on the raw water side of the flow path switching valve is in an open position, in the shower head with water purification function.
Figure 17:
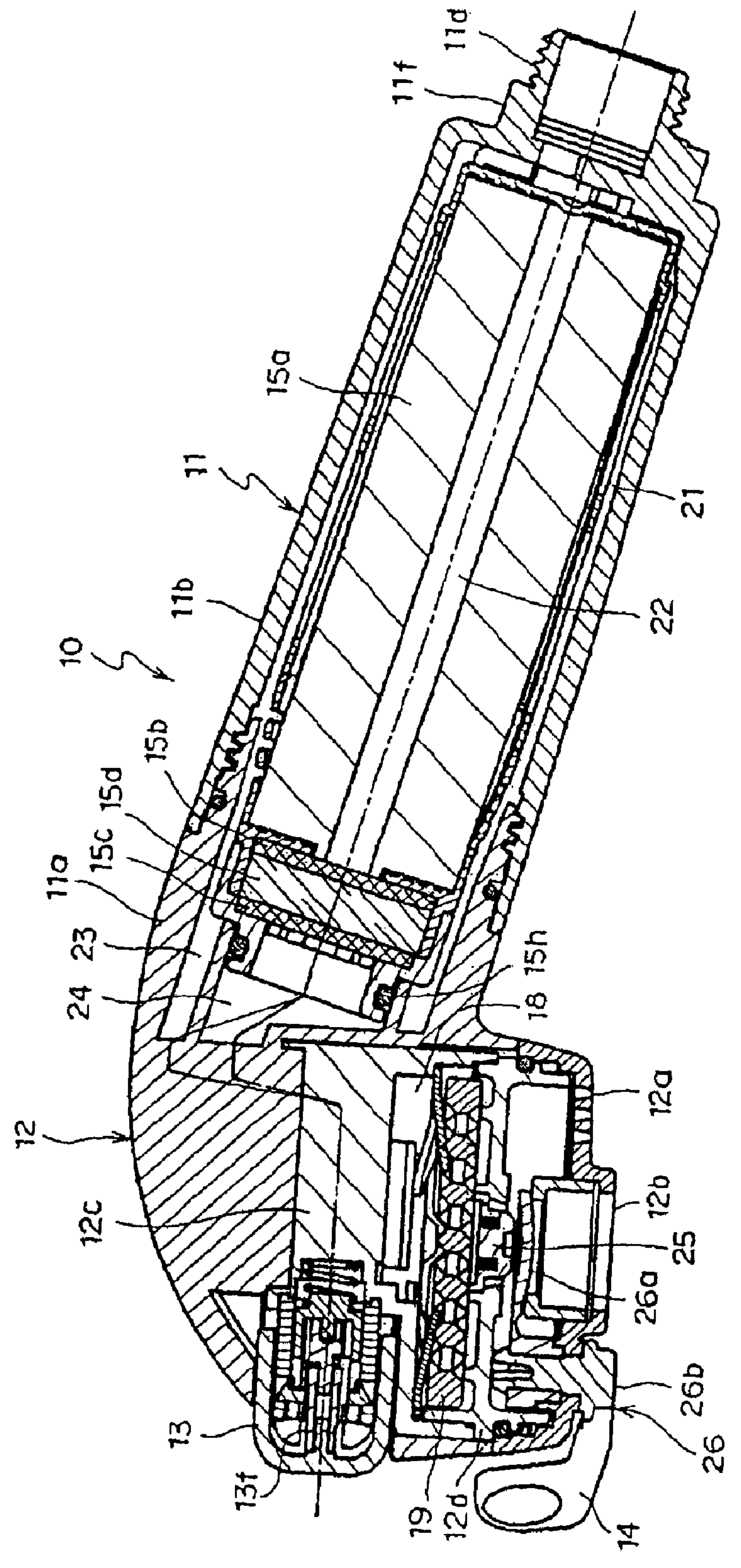
FIG. 17 is a sectional side view showing the case where the cutoff valve on the raw water side of the flow path switching valve is in the open position, in the shower head with water purification function.
Figure 18:
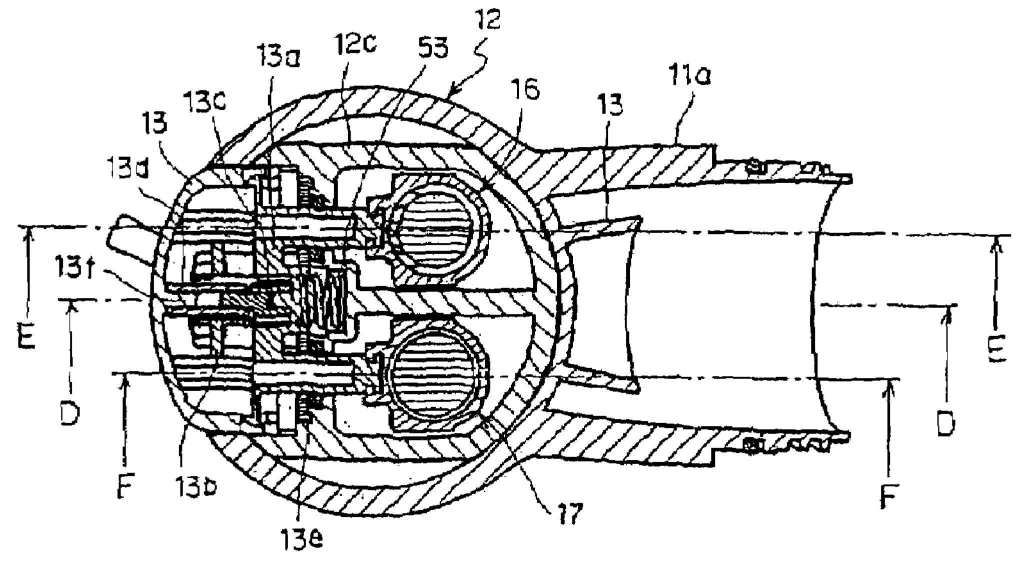
FIG. 18 is a plan view in section showing the case where the cutoff valve on the raw water side of the flow path switching valve is in the open position, in the head part of the shower head with water purification function.
Figure 19:
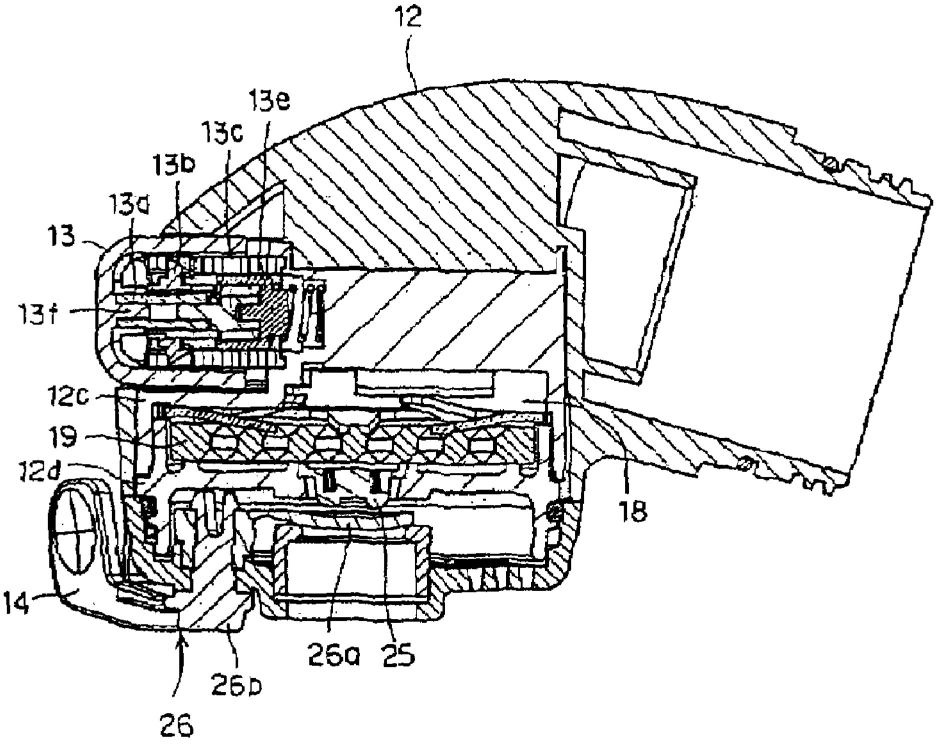
FIG. 19 is an enlarged sectional side view at a position cut along the line D-D in FIG. 18.
Figure 20:
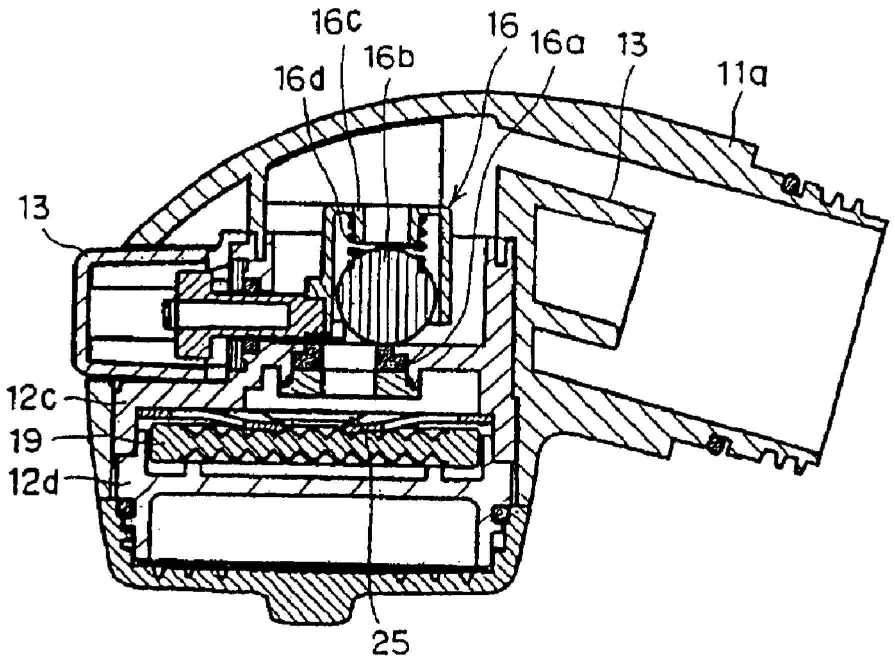
FIG. 20 is a sectional side view at a position cut along the line E-E in FIG. 18.
Figure 21:
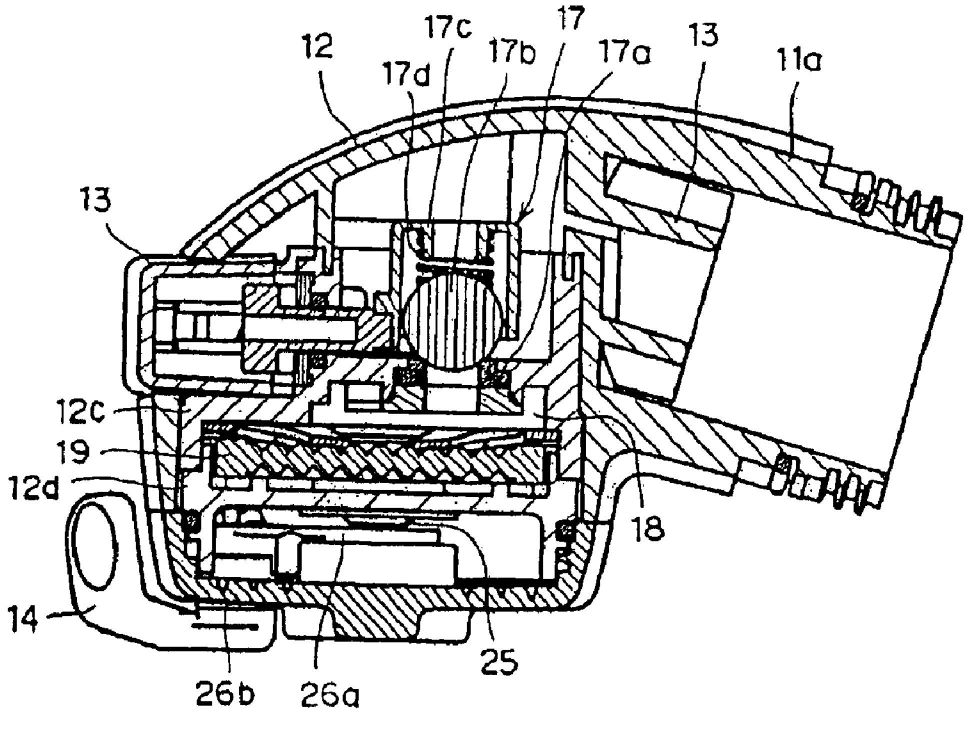
FIG. 21 is a sectional side view at a position cut along the line F-F in FIG. 18.

Between the push button 13, and the cutoff valve 16 and the cutoff valve 17, as shown in FIGS. 5, 8 and 12, a switching shaft 13*a* having two push rods 31 integrally formed, which engage with the valving element supporting material 16*c* and the valving element supporting material 17*c* to simultaneously push the valving element supporting material 16*c* and the valving element supporting material 17*c*, to thereby move the valving element 16*b* and the valving element 17*b* at the same time, and a combination of three parts, that is, a switching ring 13*b*, a first switching frame 13*c* and a second switching frame 13*d*, constituting a cam mechanism for changing the moving distance of this switching shaft 13*a*, are fitted at a predetermined position.

The switching shaft 13*a* is formed such that the two push rods 31 are arranged on both sides, and a cylindrical member having a bottom 32 is arranged in the central portion thereof, with the bottom facing the valve side, and the cylindrical member having a bottom 32 and each push rod 31 are connected by two plate-like support members 33, with a predetermined interval, respectively.

At the end portion on the external side of the portion where the support members 33 of respective push rods 31 are connected, there are formed claw members 34 for engaging with the side of the push button 13 so as to protrude, with resilience so as to be able to freely come close to or alienate from the end portion, respectively. At the respective end portions where the claw members 34 are provided, guide members 35 are formed in a protruding condition, which guide the moving direction of the push rods 31 perpendicularly with respect to the protruding direction of each claw member 34.

The switching ring 13*b* is constructed such that grooves 36*a* are engraved on the inner diameter side of a cylinder portion 36, a guard portion 37 is provided on the outer periphery of the cylinder portion 36, and claws 38 are protruded, which engage with a switching cover 13*e* described later to thereby fix the position, at the upper and lower end portions of the guard portion 37, as shown in FIG. 13(A) to FIG. 13(E).

The grooves 36*a* engraved on the inner diameter side of the cylinder portion 36 is constructed such that axially shallow grooves 361 and axially deep grooves 362 are engraved alternately, and slopes 36*b* inclined to the same direction are formed on the end face on the switching shaft side where there is no groove engraved, so that the end portions of ribs 43 provided on the first switching frame 13*c* abutting against it move along the direction of the formed slope 36*b* and are guided to come into either the engraved shallow groove 361 or the axially deep groove 362.

The first switching frame 13*c* is divided into a thin shaft 41 and a thick shaft 42, as shown in FIG. 14(A) to FIG. 14(E), and three ribs 43 extending axially towards the thick shaft 42 are arranged in a standing condition at an equal pitch on the periphery thereof. At the end portion located on the switching ring side of this rib 43, there is formed a slope 43*a* inclined in the same direction with the slope 36*b* provided at the end face on the switching shaft side of the switching ring 13*b*.

The second switching frame 13*d* is formed, as shown in FIG. 15(A) to FIG. 15(D), such that on a cylindrical member 44 having a hole with the thin shaft 41 of the first switching frame 13*c* being inserted into one end thereof, and a positioning support rod 13*f* of the push button 13 protruding to the inner central portion being inserted to the other end thereof, six ribs 45 are arranged in a standing condition at an equal pitch on the periphery thereof at the end portion located on the first switching frame side, and at the end portion where the ribs are arranged, there are formed concave portions 44*a* with the end face inclined. The end portion of the first switching frame 13*c* where the slopes 43*a* of the ribs provided thereon abuts against those concave portions 44*a*. The ribs 43 of the first switching frame 13*c* abutting against the concave portions move along the slope formed on the inclined concave portions 44*a*, to thereby rotate the first switching frame 13*c* in a certain direction.

The switching cover 13*e* is formed, as shown in FIG. 12, in such a manner that a cylinder portion 48 is formed in the central part of a plate portion 47 where push rod insertion holes 46 are formed, into which the cylindrical member having a bottom 32 of the switching shaft 13*a* is internally fitted so as to be able to move freely in the axial direction, and the cylinder portion 36 of the switching ring 13*b* is internally fitted, holes 49 engaged with the claws 38 of the switching ring 13*b* are formed on the upper and lower positions of the tip portion of this cylinder portion 48, and notches 50 are formed, which makes it possible that the support members 33 of the switching shaft 13*a* pass movably in the axial direction, on the side face where the push rod insertion holes 46 of the cylinder portion 48 are formed.

Between the side wall where the push rod insertion holes 51 of the partition member 12*c* which divides the inside of the head part 12, and the plate portion 47 where the push rod insertion holes 46 of the switching cover 13*e*, O-rings 52 are placed corresponding to the position where respective push rod insertion holes 46 and 51 are formed, and a coil spring 53 is arranged and intervened in the middle portion of the O-rings, to energize the bottom of the cylindrical member having a bottom 32 of the switching shaft 13*a* by a spring force in the direction of alienating from the side wall of the partition member 12*c*.

In the case where the switching shaft 13*a* moves in the direction of alienating from the side wall of the partition member 12*c* by the spring force of the coil spring 53, the ribs 43 of the first switching frame 13*c* enter into the deep grooves 36*a* (362) of the switching ring 13*b*. If it is in such a condition that there is nothing obstructing the movement thereof, the first switching frame 13*c* and the second switching frame 13*d* abutting against the cylindrical member having a bottom 32 slide in the same direction as the moving direction of the switching shaft 13*a*, within the deep groove 36*a* (362) engraved in the cylinder portion 36 of the switching ring 13*b*, until the end edge on the opening side of the cylindrical member having a bottom 32 provided on the switching shaft 13*a* abuts against the guard portion 37 of the switching ring 13*b* and stops.

[Operation and Effects]

In the embodiment constructed in such a manner, by operating the push button 13 assembled in the head part 12, the purified combination water flows out in the state with the push button 13 protruding from the head part 12 (with a shallow indentation), and raw water flows out in the state with the push button 13 entering in the head part 12 and the protruding amount thereof is small (with a deep indentation).

At first, when it is assumed that the purified combination water is flowing out, as shown in FIG. 16 to FIG. 21, when the push button 13 is pushed, the second switching frame 13*d* abutting against the push button 13 pushes the first switching frame 13*c*, to transmit the thrust from the first switching frame 13*c* to the switching shaft 13*a*, to thereby move the switching shaft 13*a* in the direction approaching the side wall of the partition member 12*c*, against the spring force of the coil spring 53.

At this time, if the first switching frame 13*c* slides in the groove of the switching ring 13*b* and moves until it comes off the groove, the first switching frame 13*c* pushed by the second switching frame 13*d* moves so as to change the direction to adhere in accordance with the shape of the abutting portion of the second switching frame 13*d* and the first switching frame 13*c*. As a result, the first switching frame 13*c* rotates, to change the relative position of the first switching frame 13*c* and the end face 36*b* of the switching ring 13*b*, and open the cutoff valve 16 and close the cutoff valve 17, thus switches over to the outflow of the non-purified combination water.

When the cutoff valve 16 is opened and the cutoff valve 17 is closed, to change the flowing-out combination water to the non-purified combination water, the switching shaft 13*a* is returned by the amount of play by means of the spring force of the coil spring 53. As a result, the end portions of the ribs provided on the first switching frame 13*c* abut against the shallow grooves engraved on the switching ring 13*b* to thereby fix the position.

By pushing the push button 13 again, to transmit the thrust from the second switching frame 13*d* abutting against the push button 13 to the first switching frame 13*c* and to the switching shaft 13*a*, the switching shaft 13*a* is moved in the direction approaching the side wall of the partition member 12*c* against the spring force of the coil spring 53. Then, the end portions of the ribs provided on the first switching frame 13*c* come off the engagement with the shallow groove 36*a* (361) engraved on the switching ring 13*b*, and the first switching frame 13*c* pushed by the second switching frame 13*d* moves so as to change the direction to adhere in accordance with the shape of the abutting portion of the second switching frame 13*d* and the first switching frame 13*c*. As a result, the first switching frame 13*c* rotates, to change the relative position of the first switching frame 13*c* and the end face 36*b* of the switching ring 13*b* .

As a result, as shown in FIG. 5 to FIG. 11, the ribs 43 provided on the first switching frame 13*c* enter into the axially deep grooves 36*a* (362) on the switching ring 13*b*, and the ribs 43 provided on the first switching frame 13*c* is made to slide along the groove on the switching rings 13*b*, in the direction alienating from the side wall of the partition member 12*c*. Thereby, the switching shaft 13*a* abutting against the first switching frame 13*c* is moved in the direction alienating from the side wall of the partition member 12*c*, to close the cutoff valve 16 and open the cutoff valve 17, so as to switch to the outflow of the purified combination water.

In the case of the shower delivery, when the switching lever 14 is operated, separately from the operation of the push button 13, to be rotated about the shaft portion 26*b*, the valving element 26*a* comes off the inlet portion of the straight delivery port 12*b*, and the combination water flowing out from the collecting and transient section 25 flows into the inlet portion of the straight delivery port 12*b*, to thereby cause straight delivery flow.

Moreover, in the case of the straight delivery, when the switching lever 14 is operated in the opposite direction, to be rotated about the shaft portion 26*b* in the reverse direction, the valving element 26*a* comes into the inlet portion of the straight delivery port 12*b*, and the combination water flowing out from the collecting and transient section 25 is prevented from flowing into the inlet portion of the straight delivery port 12*b*, to thereby change the flow path to the shower delivery port 12*a* side, and effect shower delivery flow, as shown in FIG. 6.

In such an embodiment, the restriction on the flow path switching valve comprising the cutoff valves 16 and 17 for changing over the water quality can be extended to the range which can be incorporated in the head part 12, and hence the restriction on the size of the flow path switching valve can be considerably eased. Since the operation of the flow path switching valve is possible on the head part 12 side, the operability is improved. Moreover, the weight distribution between the head part 12 and the holding part 11 can be made well-balanced, and as a result, the shower head can be formed in a shape and structure well-balanced in view of handling of the shower head.

By the incorporation of the water quality purification cartridge 15 in the holding part 11, a part of the raw water flow path can be formed on the outer peripheral side of the water quality purification cartridge 15, and a part of the water purification flow path running from this raw water flow path to the central space 22 formed in the central part of the water quality purification cartridge 15 via the water quality purification material 15*a* provided in the water quality purification cartridge 15 can be formed. As a result, the flow path construction can be simplified and can be made compact, and the structure of the holding part 11 becomes simple, thereby contents of the water quality purification material 15*a* can be stored in a larger amount.

The flow path on the upstream side of the water quality purification material 15*a* becomes a common flow path for the raw water and the purified water. Hence, solid substance and other built-up substance accumulated at the time of discharging the purified water, which may cause clogging, can be flushed at the time of discharging the raw water, thereby making it hard to be clogged, and the life of the water quality purification material 15*a* can be extended.

The water quality purification cartridge 15 is built in the holding part 11, and the flow path switching valve is incorporated in the head part 12. Hence, the flow path can be formed in the simplest manner, and the weight distribution is well-balanced, thereby the shower head becomes well-balanced in view of handling, lightweight and cheap.

Since the raw water cutoff valve 16 and the purified water cutoff valve 17 are alternately switching type cutoff valves which cut off the flow path alternately by the same push button 13, by pushing the push button 13 protruding on the head part 12, the flow path switching valve can switch between the purified combination water and non-purified combination water for use, thereby the operability is improved.

Moreover, the raw water cutoff valve 16 and the purified water cutoff valve 17, being the alternately switching type cutoff valve, are respectively spherical valving elements 16*b* and 17*b*. Hence, water pressure applied on the spherical valving elements 16*b* and 17*b* acts so as to push the spherical valving elements 16*b* and 17*b* towards the valve seats 16*a* and 17*a*, together with the energizing force of the coil springs 16*d* and 17*d*, thereby enabling reliable seal.

Since the delivery flow switching valve 26 is formed as a cutoff valve operated by a lever, even in the case where either of the raw water cutoff valve 16 and the purified water cutoff valve 17 is opened, the shower delivery flow and the straight delivery flow can be selected, thereby enabling improvement of the convenience.

This shower head 10 with water purification function can be used also in the toilet, bathroom of the like, other than the kitchen, and hence generality is very high.

[Other Aspects]

Since the above-described embodiment is specifically described for easy understanding of the general idea of the invention, but does not impose any limitation on the contents of the invention. Hence, it does not limit other aspects which are not particularly described, and may be adequately changed. In this context, other aspects in accordance with the general idea of the invention will now be described.

[First Other Aspect]

Figure 22:
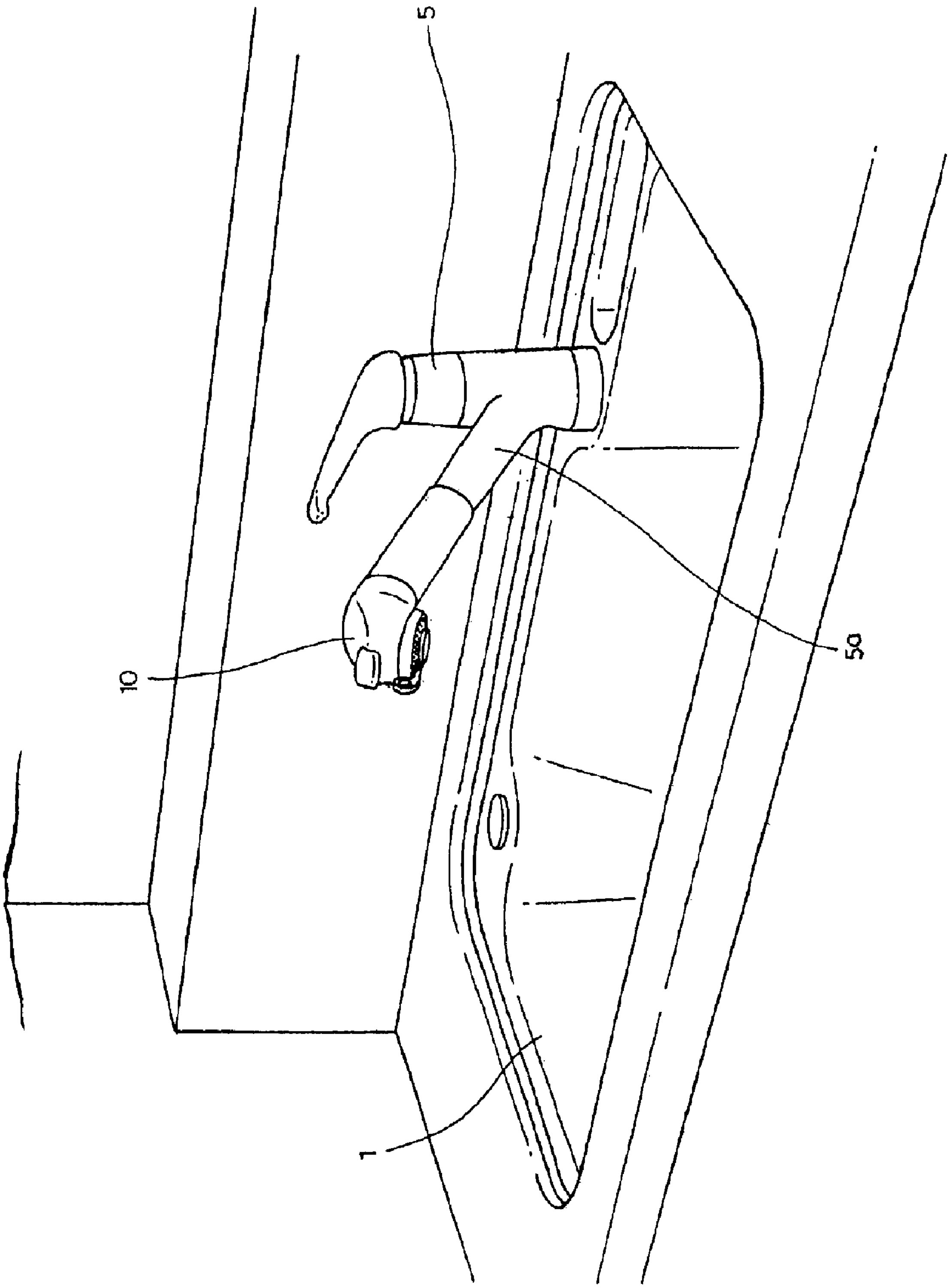
FIG. 22 is a perspective view showing the shower head with water purification function attached to a faucet of a hose drawn-out and enclosed type in a first other aspect of the embodiment of the present invention.

In the above embodiment, the shower head 10 with water purification function is connected to the combination taps 2 via the exposed hose 3 connected to the combination taps 2. However, as shown in FIG. 22, the shower head 10 with water purification function may be mounted to a hose (not shown) inserted into a holder section 5*a* of the combination taps 5, and provided so as to be able to be freely pulled out or stored.

In this case, at the time of use, the shower head 10 with water purification function can be pulled out from the holder section 5*a*, according to need, to extend the hose, and discharge combination water at an optional position. After use, while returning the hose into the holder section 5*a*, the shower head 10 with water purification function is engaged therewith to return it to the original state. As a result, the delivery range can be enlarged from the position close to the combination taps 5 to the limit where the hose can be extended, thereby the appearance around the taps is improved, and the user-friendliness can be also improved.

[Second Other Aspect]

Figure 23:
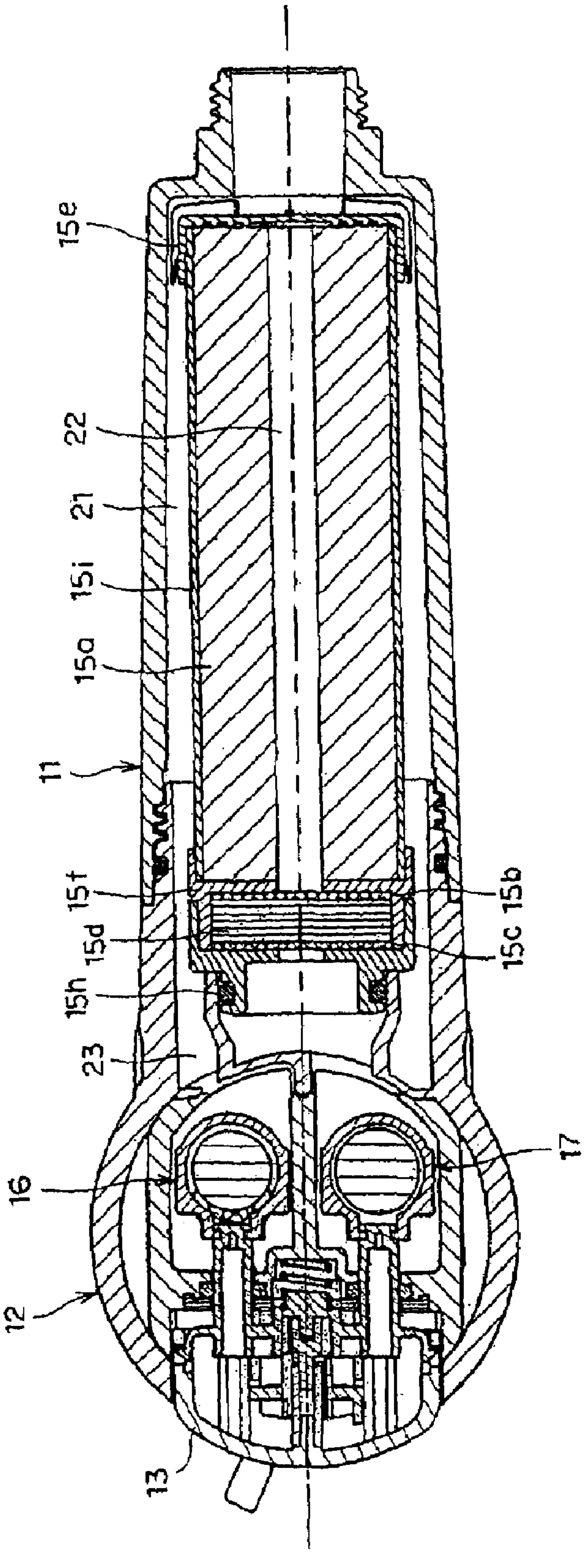
FIG. 23 is a plan view in section showing a shower head with water purification function provided with a water quality purification cartridge having a filtering material on the outer periphery of a water quality purification material in a second other aspect of the embodiment of the present invention.
Figure 24:
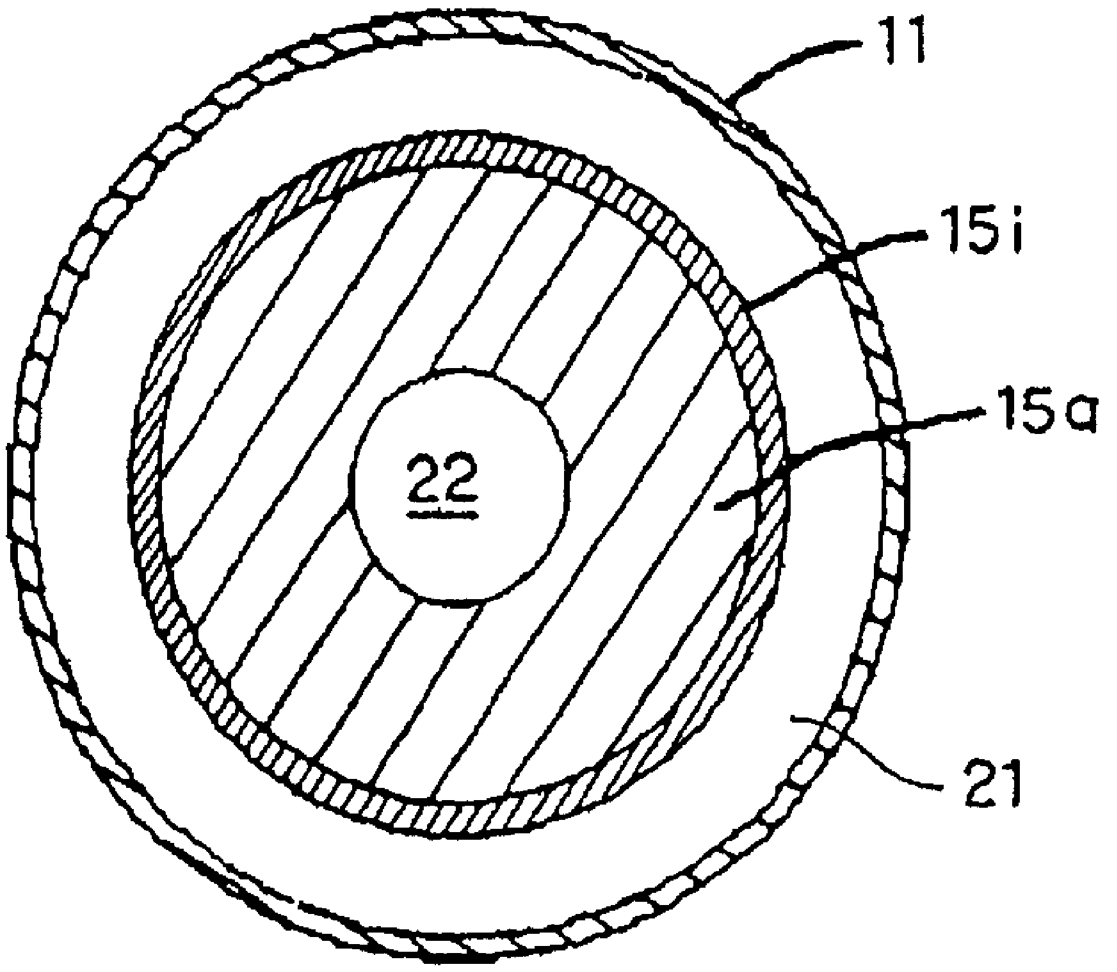
FIG. 24 is a sectional view with respect to a face vertical to the axial direction of a holding part of the shower head with water purification function in the second other aspect.

In the above embodiment, the water quality purification cartridge 15 has a cap 15*e* covering the whole water quality purification material 15*a* which purifies the combination water, and the water quality purification material 15*a* comprising activated carbon as a main component and solidified in a cylindrical shape, is stored in the cap 15*e*. However, as shown in FIG. 23 and FIG. 24, a filtering material 15*i* may be provided on the outer periphery of the water quality purification material 15*a*, and the shape of the cap 15*e* may be changed so that most part of the filtering material 15*i* is exposed in the combination water directly.

In this case, the water quality purification cartridge 15 is constructed in such a manner that the filtering material 15*i* is provided on the outer periphery of the water quality purification material 15*a* comprising activated carbon as a main component, and the cap 15*e* is formed in a shape holding only the end portion on the upstream side of the water quality purification material 15*a*, and the end portion thereof on the downstream side is held by a cap 15*f*, so that the most part on the outer periphery of the water quality purification material 15*a* covered with the filtering material 15*i* is exposed.

As a result, at the time of discharging raw water, built-up substance accumulated on the surface of the filtering material 15*i* at the time of discharging purified water can be flushed, by the combination water which passes the outer periphery of the water quality purification material 15*a* covered with the filtering material 15*i*, in the common flow path of the raw water and the purified water on the upstream side than the water quality purification material 15*a*. Hence, clogging is unlikely to occur, and deterioration of the water quality purification material 15*a* can be prevented, to thereby maintain the water quality purification performance at a high level for a long period of time.

[Third Other Aspect]

Figure 25:
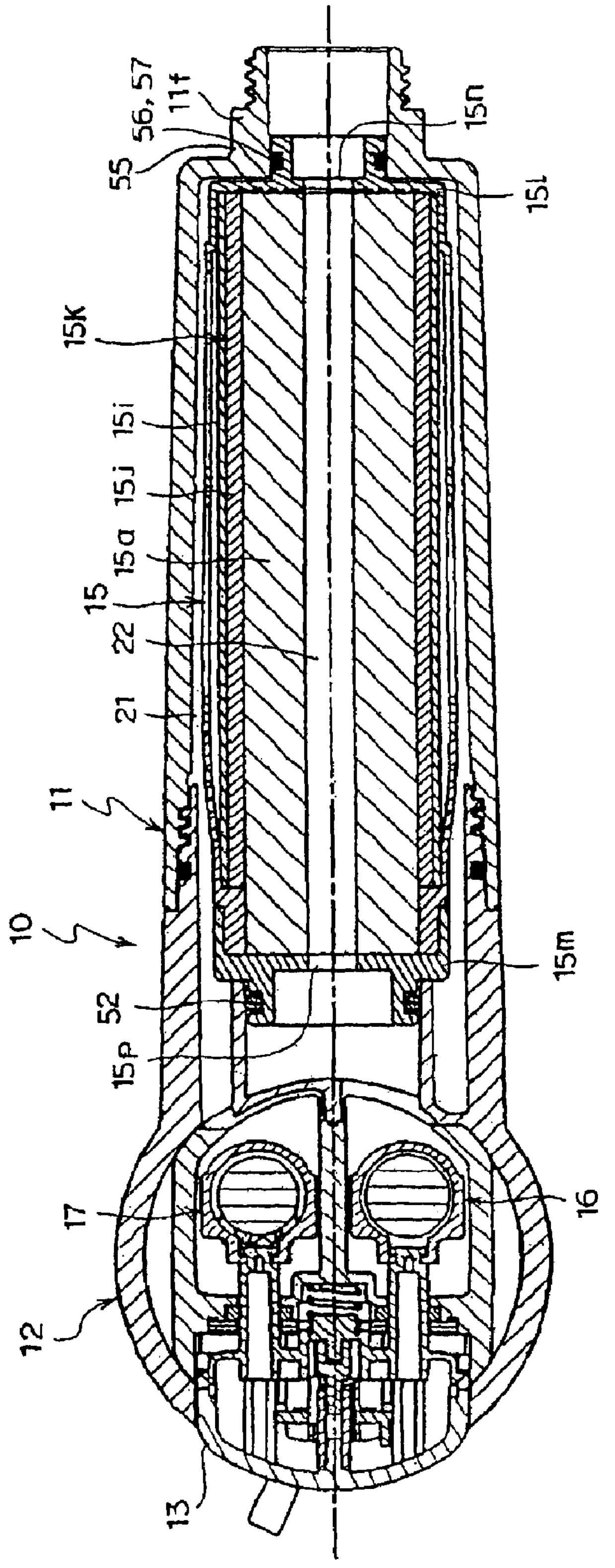
FIG. 25 is a plan view in section showing a shower head with water purification function, wherein the central space of a water quality purification cartridge is made to be a raw water flow path, in a third other aspect of the embodiment of the present invention.

In the above embodiment, the raw water passes through the outer peripheral flow path 21 formed on the outer periphery of the water quality purification cartridge 15 as the raw water flow path, and the water purification flow path is formed such that water is purified by penetrating from the outer peripheral flow path 21 through the water quality purification material 15a and coming out to the central space 22. On the contrary as shown in FIG. 25, the construction maybe such that the raw water passes the central space 22 as the raw water flow path, and the water purification flow path may be formed in such a manner that water is purified by penetrating from this central space 22 through the water quality purification material and flowing out to the outer peripheral flow path 21.

That is to say, the central part of the water quality purification cartridge 15 is formed as the raw water flow path, and the outer peripheral flow path 21 of the water quality purification cartridge 15 is formed as the water purification flow path, and individual members other than the member associated with the flow path formation are made to be the same as those of the above embodiment. As a result, there is formed a shower head which switches between discharge of the purified water which penetrates through the water quality purification material 15*a* from the central space 22 toward the outer peripheral side, and discharge of the raw water passing the central space 22 without penetrating through the water quality purification material 15*a*, by the operation of the push button 13 provided in the head part 12.

The water quality purification cartridge 15 is formed in such a manner that a water quality purification material 15*k* formed in a cylindrical shape, which comprises three layers, that is, a water quality purification material 15*a* arranged on the inner side, and comprising activated carbon solidified in a cylindrical shape by providing a central space 22, being an open hole concentric with the central axis, as a main component, a germicidal ceramic 15*j* formed in a cylindrical shape and arranged on the outer periphery of this activated carbon, and a filtering material 15*i* comprising a nonwoven fabric which covers the outer periphery of the filtering material 15*i*, is housed in a space formed by divided caps 15*l* and 15*m*.

Of these, a hole 15*n* is formed in the central portion at the end face of the cap 15*l*, and a hole 15*p* is formed in the central portion at the end face of the cap 15*m*, so that raw water flowing from the faucet (or a hose) side into the holding part 11 can pass through the hole 15*n* and flow into the central space 22, and flow out to the cutoff valve side, after having passed through the hole 15*p* from the central space 22.

At the end portion on the raw water inflow side of the water quality purification cartridge 15, a protruding cylinder portion 55 to be internally fitted to a hose connecting portion 11*f* of the holding part 11 is formed, and an O-ring groove 56 is engraved on the outer periphery of the cylinder portion 55. An O-ring 57 is fitted in the O-ring groove 56, to seal between the inner face of the hose connecting portion 11*f* and the outer periphery of the cylinder portion 55, so that the raw water is prevented from flowing into the water purification flow path (the outer peripheral flow path 21) side.

Since the respective positions of the cutoff valve 16 on the raw water side and the cutoff valve 17 on the purified water side arranged in the head part 12 are opposite to those in the above embodiment, and the outer peripheral flow path 21 of the water quality purification cartridge 15 is designated as the water purification flow path, a valve arranged at a position communicating with the flow path on the upstream side of the water quality purification cartridge 15 is designated as the cutoff valve 17 on the purified water side, and a valve arranged at a position communicating with the flow path on the central space 22 of the water quality purification cartridge 15 is designated as the cutoff valve 16 on the raw water side. Thus, the positions of the valve seats through which the purified water or the raw water passes are positions opposite to those in the above embodiment.

By the arrangement of these cutoff valves, the relation between the operation of the push button 13 and the opening or closing operation of each cutoff valve 16, 17, or the delivery state becomes opposite to that in the above embodiment. That is to say, in the case where the push button 13 is in the position of shallow indentation, the cutoff valve 16 on the raw water side is opened, and the cutoff valve 17 on the purified water side is closed, to discharge raw water. When the push button 13 is in the position of deep indentation, the cutoff valve 17 on the purified water side is opened, and the cutoff valve 16 on the raw water side is closed, to discharge purified water.

[Fourth Other Aspect]

Figure 26:
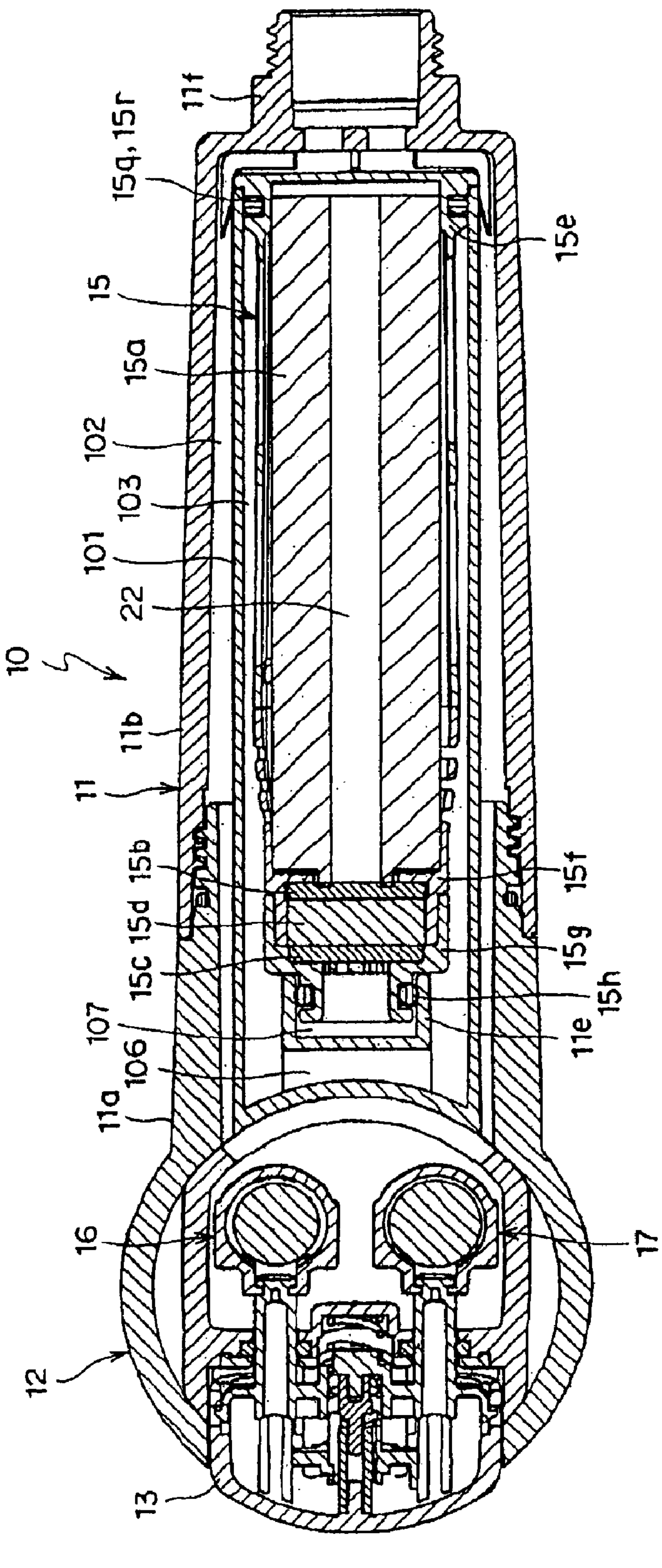
FIG. 26 is a plan view in section showing a shower head with water purification function, which purifies water after the water has passed through a cutoff valve, in a fourth other aspect of the embodiment of the present invention.
Figure 27:
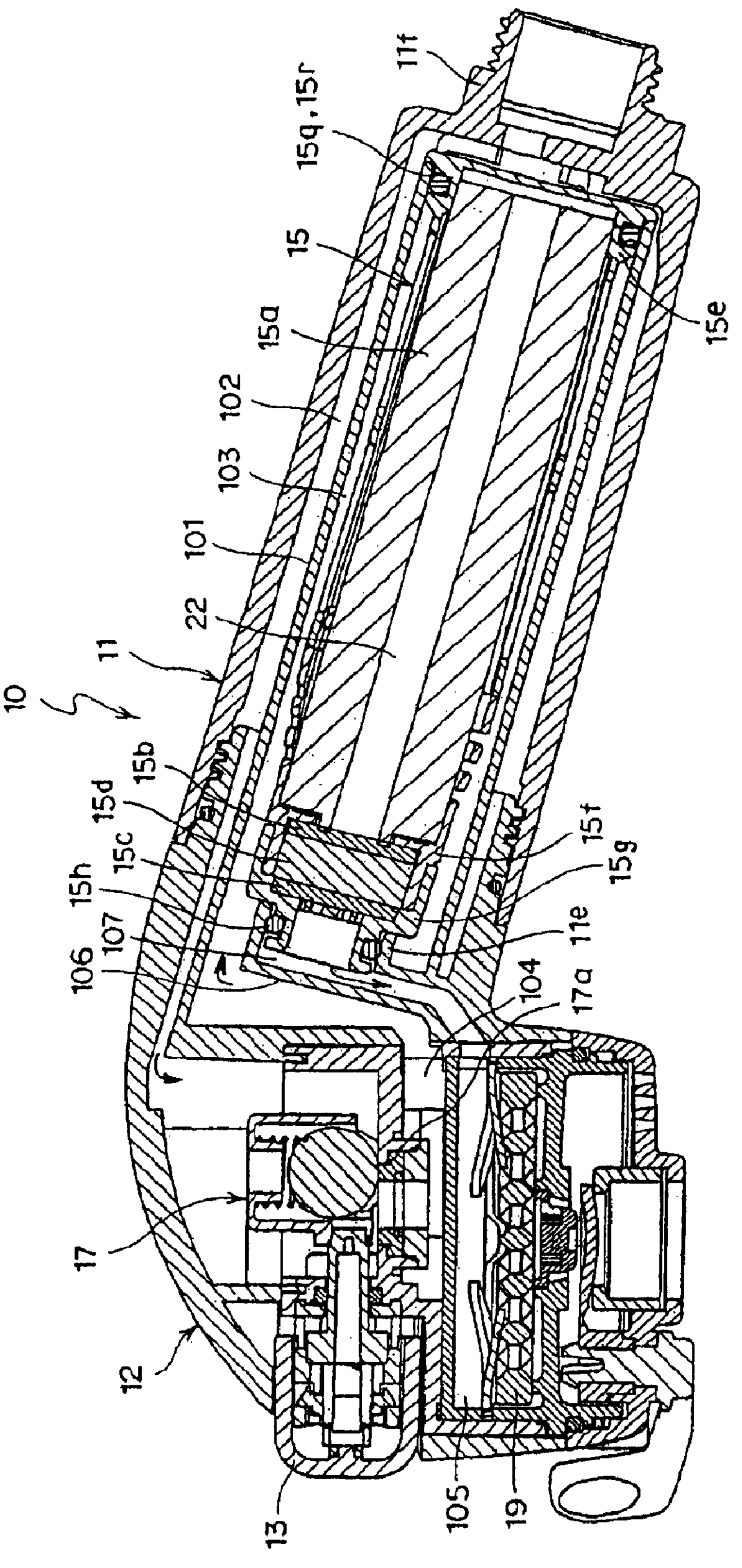
FIG. 27 is a sectional side view showing a shower head with water purification function in the fourth other aspect.

In the above embodiment, the flow path is formed such that the combination water reaches the cutoff valve 17 on the purified water side after being purified. However, on the contrary, as shown in FIG. 26 and FIG. 27, the flow path is formed such that the combination water passes through the cutoff valve 17 on the purified water side, and then penetrates through the water quality purification material 15*a* to thereby be purified.

That is to say, individual members other than the members related to the construction of the flow path have the same construction as in the above embodiment, and the point that a shower head in which the purified water and the raw water are switched by the push button 13 provided in the head part 12 is the same.

The points different from the above embodiment in view of the construction are described below.

At first, on the inner side of a cylinder portion 11*a* protruding from the head part 12 side, an inner cylinder portion 101 protruding until reaching the end portion on the upstream side of the water quality purification cartridge 15 is concentrically provided with a predetermined flow path width therebetween, to thereby form a raw water flow path 102 on the outside of the inner cylinder portion 101, and a cartridge outer peripheral flow path 103 on the inside of the inner cylinder portion 101. This cartridge outer peripheral flow path 103 communicates with a flow path 104 on the downstream side of the cutoff valve 17.

Then, on the inner side of the inner cylinder portion 101, a cartridge accepting portion 11*e*, into which a cap 15*g* arranged on the head part side of the water quality purification cartridge 15 is inserted, is formed at the tip portion thereof. A section linking from the tip portion to a collecting portion 105 formed on the outlet side of the cutoff valve 16 on the non-purified side forms a rectangular purified water conduit 106 in the inner cylinder. The outside of this purified water conduit 106 in the inner cylinder becomes a flow path communicating with the cartridge outer peripheral flow path 103, and the inside of the purified water conduit 106 in the inner cylinder becomes a purified water flow path 107, which is a flow path of the purified water having passed through the water quality purification cartridge 15.

The water quality purification cartridge in this case is constructed such that the end portion arranged on the head part 12 side is formed in the same manner as in the above embodiment. The end portion arranged on the raw water outflow side of the holding part 11 is formed such that at an end portion of the cap 15*e*, there is formed a cylindrical cap end portion with a bottom, having a thick portion abutting against the end face, and internally fitted to the tip portion of the inner cylinder portion 101, and an O-ring groove 15*q* is engraved on the outer periphery of the cap end portion, then an O-ring 15*r* which prevents liquid leakage is fitted to the O-ring groove 15*q*, abutting against the inner face of the tip portion of the inner cylinder portion 101.

The thus formed water quality purification cartridge 15 is inserted into the inner cylinder portion 101, the cap 15*g* at the tip is internally fitted to the cartridge accepting portion 11*e*, and the cap end portion of the cap 15*e* abuts against the tip portion of the inner cylinder portion 101 to thereby secure the position. As a result, the cartridge outer peripheral flow path 103 is formed by a gap formed between the inner cylinder portion 101 and the water quality purification cartridge 15.

As a result, when raw water flows into the holding part 11 from the hose connecting portion 11*f* of the holding part 11, the raw water passes through the raw water flow path 102 formed on the outer periphery of the inner cylinder portion 101 and flows into a common space in the valve provided on the upstream of the cutoff valves 16 and 17, and is divided into raw water delivery or purified water delivery, depending on the position of the push button 13.

In the case of delivery of the purified water, as shown in FIG. 27, water passes through a valve seat 17*a* of the cutoff valve 17, and flows into the cartridge outer peripheral flow path 103 from the flow path 104 on the downstream side via the outside of the purified water conduit 106 in the inner cylinder, penetrates through the water quality purification material 15*a* of the water quality purification cartridge 15 and flows out to the central space 22. Then, the water penetrates from this central space 22 through a non-woven fabric 15*b*, a germicidal ceramic 15*d* and a non-woven fabric 15*c*, and further passing through the water purification flow path 107 on the inner side of the purified water conduit 106 in the inner cylinder, flows out to the collecting portion 105, then passes through a sintered magnetic body 19 and flows to the outside by shower delivery flow or the straight delivery flow.

In this manner, a shower head having a flow path reaching the water quality purification cartridge 15 through the cutoff valve 17 can be formed, and each flow path switching valve 16, 17 can be provided on the upstream side of the water quality purification cartridge 15. Hence, each flow path switching valve 16, 17 can be provided on either side of the upstream side and the downstream side of the water quality purification cartridge 15. These valves can select purified combination water or non-purified combination water by the operation of the push button 13 provided in the head part 12, and the straight delivery flow and the shower delivery flow can be separately selected from the selection of the purified water and the raw water.

[Fifth Other Aspect]

As another aspect of this fourth other aspect, the inner cylinder portion may be formed shorter, and a part of the flow path after having passed the cutoff valve may be provided inside of the water quality purification cartridge connected to the short inner cylinder portion.

Figure 28:
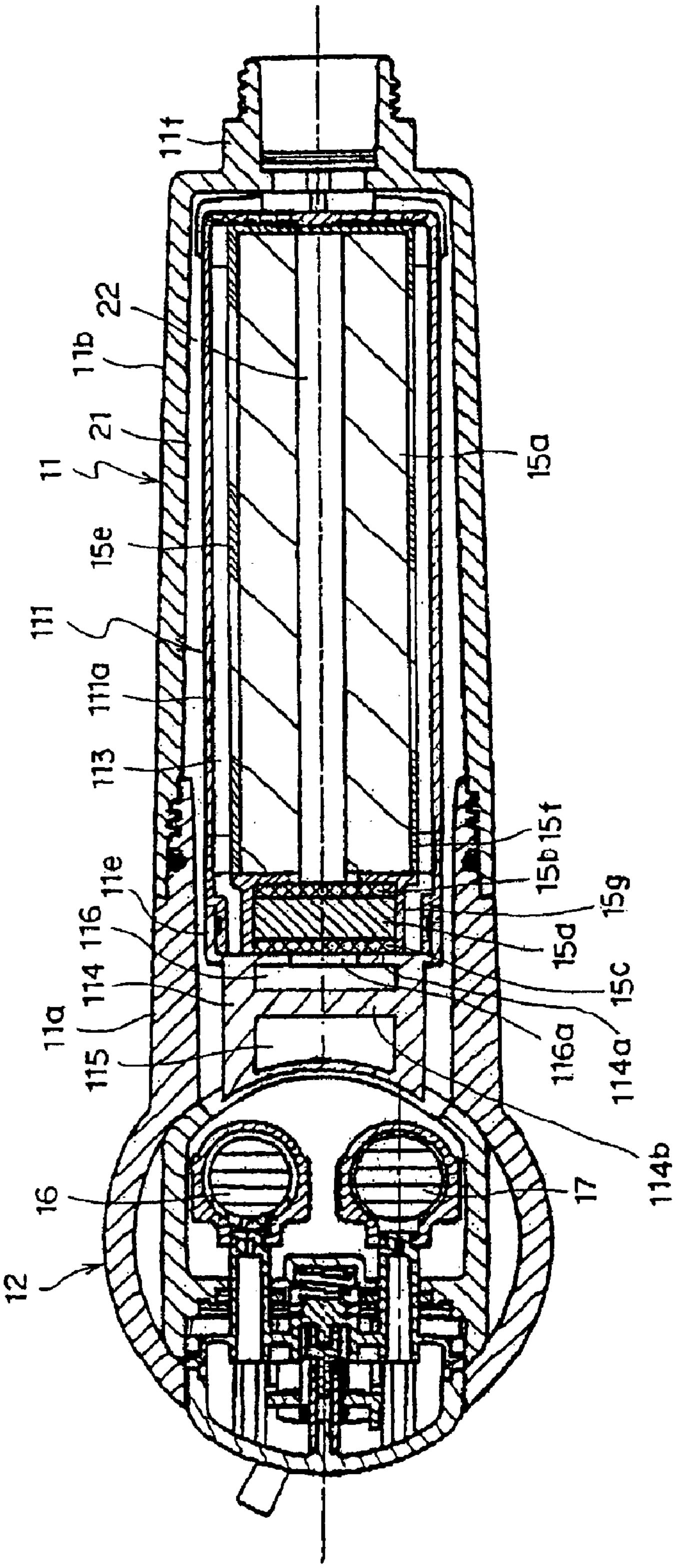
FIG. 28 is a plan view in section showing a shower head with water purification function, wherein a raw water flow path is formed in a water quality purification cartridge in a fifth other aspect of the embodiment of the present invention.
Figure 29:
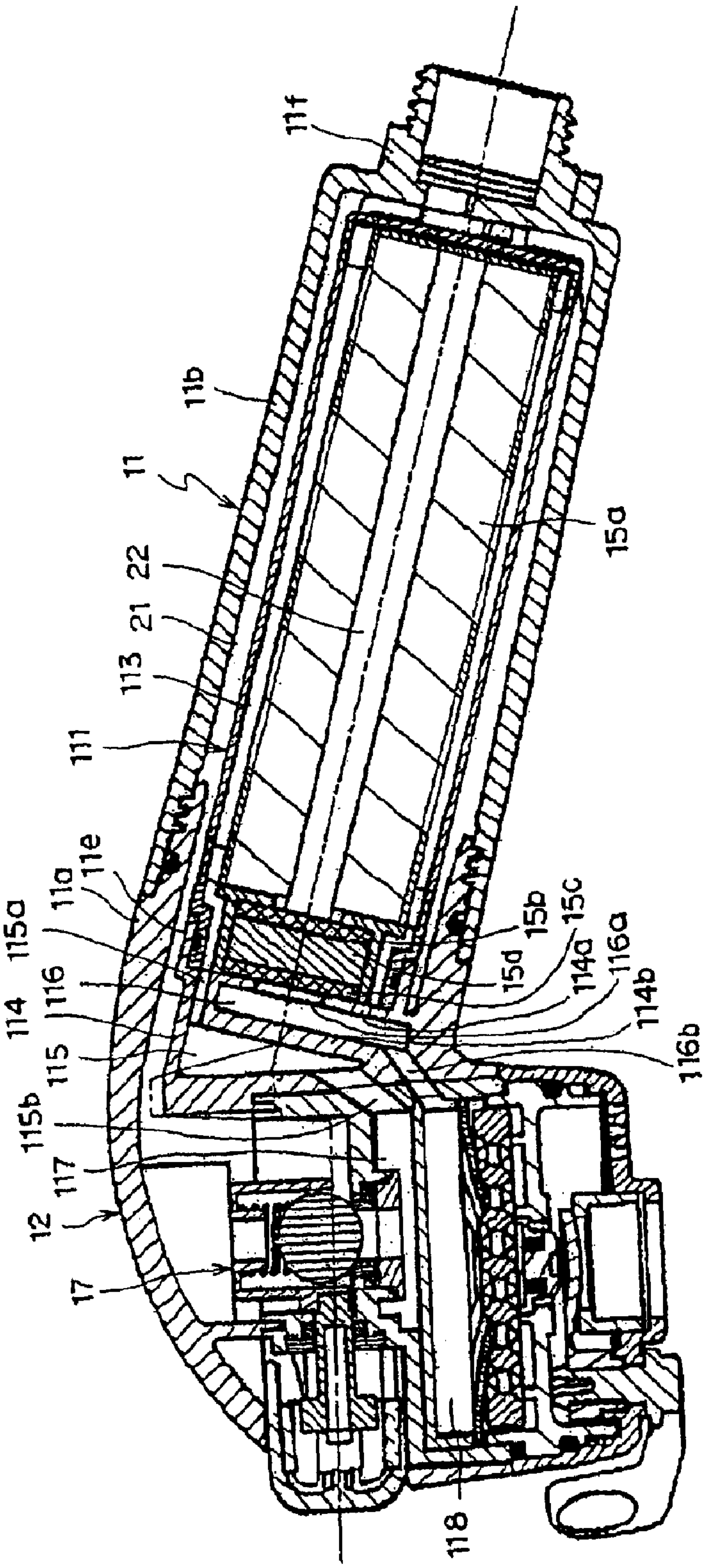
FIG. 29 is a sectional side view showing a shower head with water purification function in the fifth other aspect.

That is to say, instead of the water quality purification cartridge 15, as shown in FIG. 28 and FIG. 29, a new water quality purification cartridge 111 is formed, which has a double wall structure provided with a cartridge case 111*a* formed in a cylinder with a bottom, with a certain gap, on the outer peripheral side of each cap 15*e*, 15*f* and 15*g*. The gap formed between the cartridge case 111*a* of the water quality purification cartridge 111 and each cap 15*e*, 15*f* and 15*g* is designated as a raw water flow path 113 via a cutoff valve 17.

On the head part 12 side, there is formed a tip portion 114 having a cartridge accepting portion 11*e* formed thereon, to which the attachment end of the water quality purification cartridge 111 is fitted, and at the tip portion 114, two partition walls 114*a* and 114*b* perpendicular to the axial direction are provided with a gap inside of the tip portion 114, to thereby form two flow path spaces 115 and 116. Each communicating passage 115*a*, 115*b* and 116*b*, and a hole 116*a* are formed such that the flow path space 115 communicates with the raw water flow path 113 of the water quality purification cartridge 111 via the communicating passage 115*a*, and communicates with a flow path 117 on the downstream side of the cutoff valve 17 via the communicating passage 115*b*, and the flow path space 116 communicates with a reception portion of a germicidal ceramic 15*d* and the central space 22 of the water quality purification cartridge 111 via the hole 116*a* formed in the central portion of the partition wall 114*a*, and communicates with a collecting portion 118 via the communicating passage 116*b*.

Thereby, when the attachment end of the water quality purification cartridge 111 is fitted to a cartridge accepting portion 114 formed in the head part 12, the raw water flows into the holding part 11 from the hose connecting portion 11*f*, passes through the outer peripheral flow path 21 of the water quality purification cartridge 111 and reaches the upstream side of the cutoff valves 16 and 17, and passes through the cutoff valve 17 on the purification side to flow out to the flow path space 115 via the communicating passage 115*b*. Further, the raw water flows out to the raw water flow path 113 formed inside of the water quality purification cartridge 111, via the communicating passage 115*a* to infiltrate into and penetrate through the inside of the water quality purification material 15*a*, and then comes out to the central space 22, passes through the germicidal ceramic 15*d* clamped between the non-woven fabrics 15*b* and 15*c*, flows out to the flow path space 116 via the hole 116*a*, and further flows out to the collecting portion 118 via the communicating passage 116*b*, and passes small holes in the sintered magnetic body 19 to be delivered from the straight delivery port or the shower delivery port.

In this manner, there can be formed a shower head having a water purification flow path in which the raw water flowing into the holding part 11 passes through the outer peripheral flow path 21 of the water quality purification cartridge 111 and reaches the cutoff valve 17 for purification, and flows through the cutoff valve 17 and via the raw water flow path 113 formed inside of the water quality purification cartridge 111 to the water quality purification material 15*a*, and this holding part 11 can be used in the same operation aspect as that of the above embodiment.

[Sixth Other Aspect]

Moreover, the construction may be such that the relation between the operation of the push button 13 incorporated in the head part 12 and the opening/closing action or the delivery condition of each cutoff valve 16, 17 is made opposite to the case of the above embodiment, so that in the case of pushing the push button 13 deep, purified water is discharged, and at the position of shallow indentation of the push button 13, raw water is discharged.

For example, in the case where the arrangement of each cutoff valve 16, 17 in the head part is made the same as that of the above embodiment, in the fourth other aspect and the fifth other aspect, since the water purification flow path is different, purified water is discharged when the push button 13 is pushed deep, and at the position of shallow indentation of the push button 13, raw water is discharged.

Also in the above embodiment, if the position of the valve seat of the cutoff valve 16 and the cutoff valve 17 is made such that the positions on the raw water side and the purified water side are opposite to each other, the discharge state by means of the operation of the push button is reversed, so that in the case of shallow indentation of the push button 13, raw water is discharged, and in the case of deep indentation of the push button 13, purified water is discharged.

In these cases, other functions are not changed, and similarly functions.

[Seventh Other Aspect]

In the above embodiment, the operation end of the flow path switching valve is formed as a push button type, but the driving method of the valving element may be changed to change the operation end to a lever type.

Figure 30:
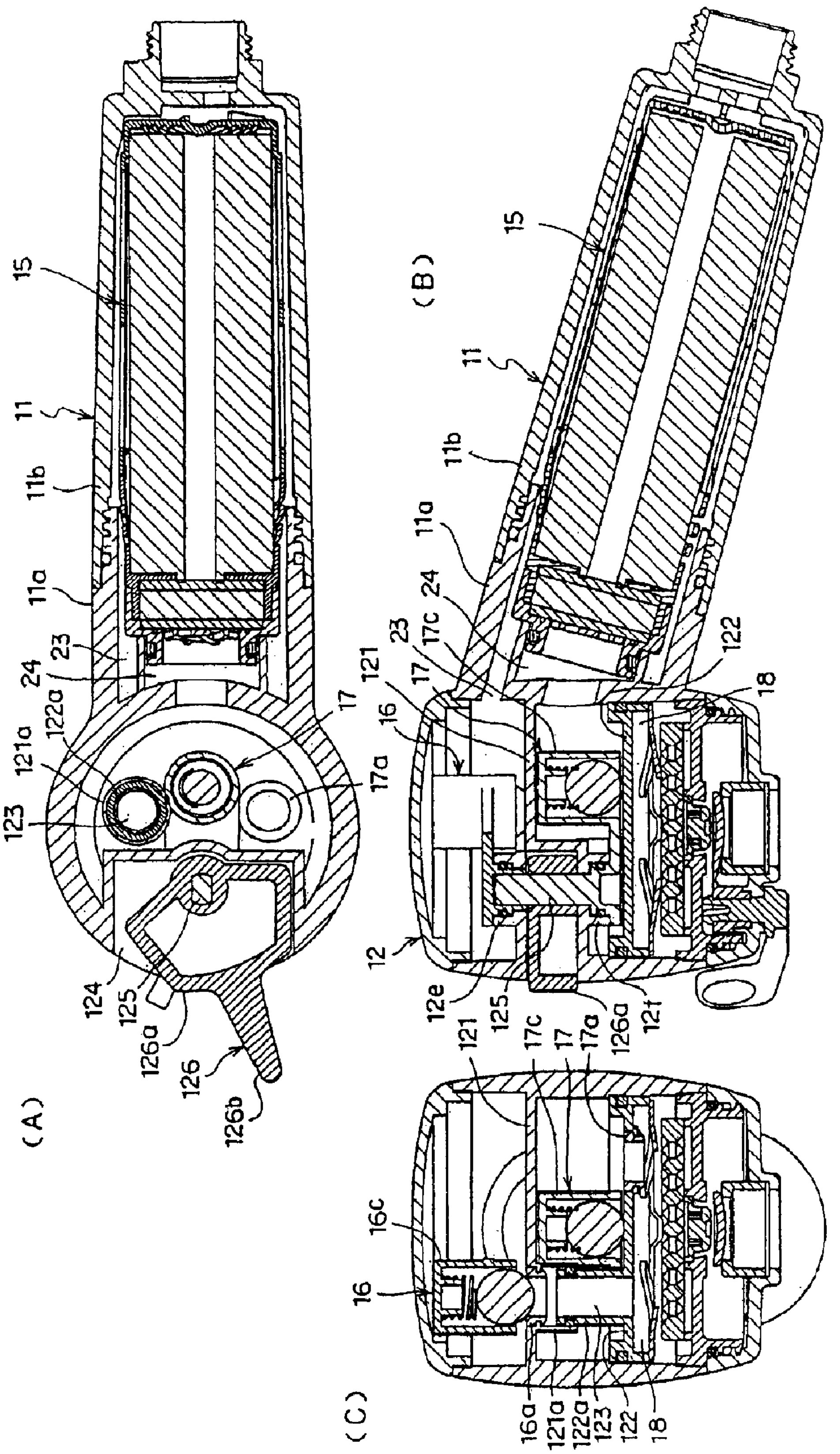
FIG. 30 is a sectional view showing the condition at the time of discharging purified water in a shower head with water purification function comprising a flow path switching valve operated by a lever, in a seventh other aspect of the embodiment of the present invention, (A) being a plan view in section, (B) being a sectional side view, and (C) being an frontal view in section of the head part.
Figure 31:
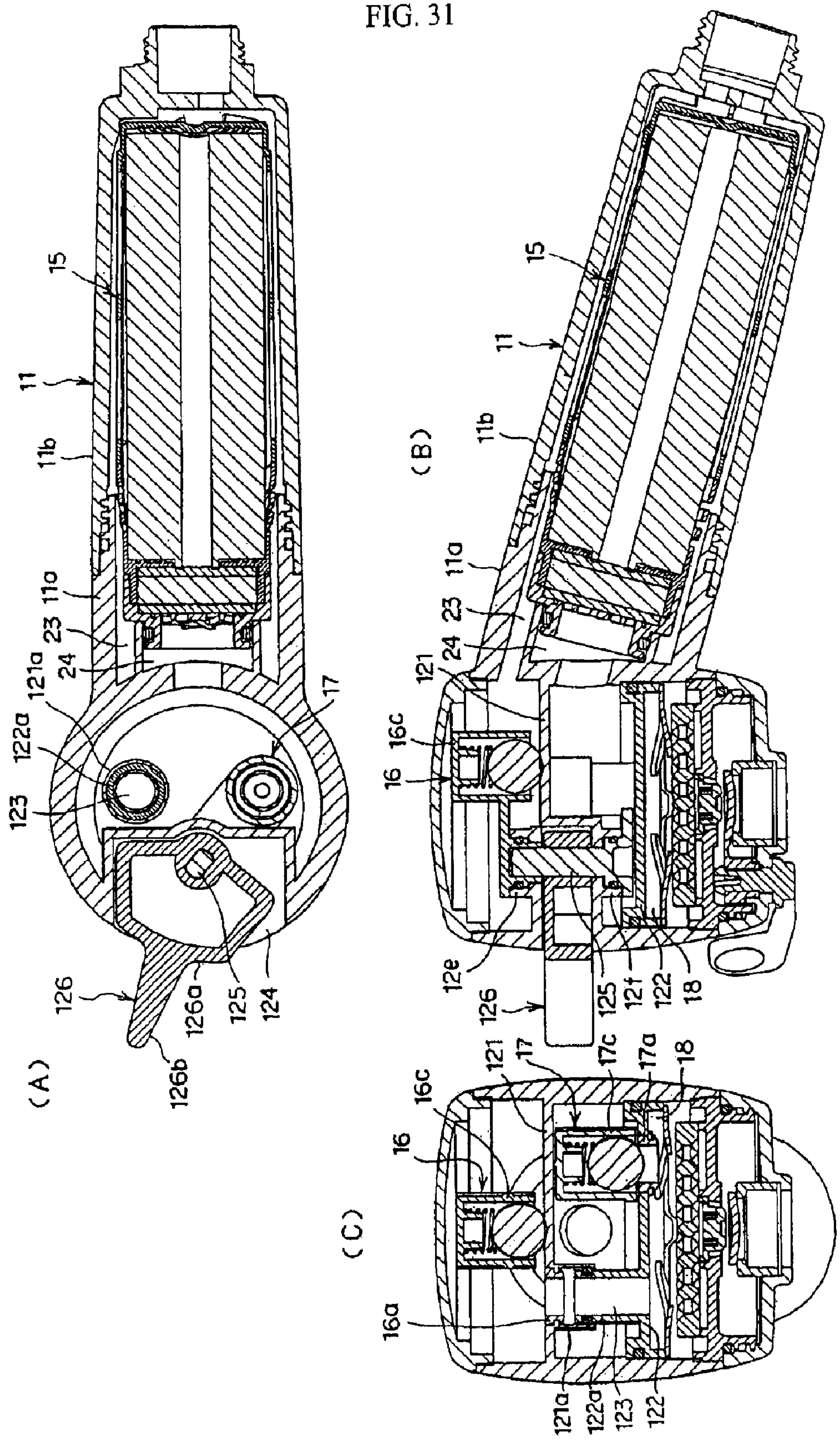
FIG. 31 is a sectional view showing the condition at the time of discharging raw water in the shower head with water purification function in the seventh other aspect, (A) being a plan view in section, (B) being a sectional side view, and (C) being an frontal view in section of the head part.

That is to say, as shown in FIG. 30 and FIG. 31, the cutoff valve 16 for raw water and the cutoff valve 17 for purified water change its height by means of the cutoff valve 16 and the cutoff valve 17, and arranged such that the upper side is for raw water and the lower side is for purified water.

A plate material corresponding to the floor on which the valve seat 16*a* of the cutoff valve 16 for raw water is provided is formed as a partition plate 121 for dividing the space between the cutoff valve 17 for purified water and the cutoff valve 16 for raw water into upper and lower spaces, and a plate material corresponding to the floor on which the valve seat 17*a* of the cutoff valve 17 for purified water is provided is formed as a partition plate 122 for dividing the space between the collecting portion 18 and the cutoff valve 17 for purified water.

At the position where the valve seat 16*a* of the cutoff valve 16 for raw water is provided, a cylindrical member 122*a* arranged in a standing condition above the partition plate 122 is fitted to a cylindrical member 21*a* hung down below a partition plate 121 axially movably and sealably, to thereby form a raw water flow path 123 for linking the upper space of the partition plate 121 with the lower space of the partition plate 122.

Above the partition plate 121, there is formed a space on the upstream side of the cutoff valve 16 communicating with the flow path 23 on the outer peripheral side of the cartridge accepting portion 11*e*, and below the partition plate 122, there is the collecting portion 18 formed on the downstream side of the cutoff valve 17, and the space between the partition plate 121 and the partition plate 122 becomes the space on the upstream side of the cutoff valve 17 communicating with the flow path 24 on the inside of the cartridge accepting portion 11*e*.

On the side peripheral face on the front side of the head part 12, there is provided a concave portion 124 formed including the partition plate 121, as a space for incorporating the operation lever. A support shaft 125 for the operation lever which perpendicularly penetrates this concave portion 124 is rotatably mounted, with a valving element support member 16*c* of the cutoff valve 16 being fixed to the upper end of the support shaft 125, and a valving element support member 17*c* of the cutoff valve 17 being fixed to the lower end of the support shaft 125. The operation lever 126 having an operation end 126*b* protruding in a cylinder shape from a planar base 126*a* extended in the radial direction of the support shaft is externally fitted to the central portion of the support shaft 125. In the vicinity of the place where each valving element support member 16*c*, 17*c* of the support shaft 125 is fixed, the operation lever 126 is fitted to bearings 125*a* and 125*b* fixed to the partition plate 121, respectively, to support the support shaft 125 rotatably.

As a result, the respective valving element support members 16*c* and 17*c* of the respective cutoff valves 16 and 17 operate at the same time in the rotation direction of the support shaft 125, which rotates corresponding to the motion of the operation end of the operation lever 126, to open or close the cutoff valves 16 and 17, respectively.

[Eighth Other Aspect]

In the seventh other aspect, the operation end of the flow path switching valve is formed as a lever, the operation end may be formed in a seesaw type push button.

That is to say, as shown in FIG. 32 and FIG. 33, a seesaw type push button 127 is formed in such a manner that the portion of the operation end 126*b*, protruding in the cylinder shape from the base 126*a* extended in the radial direction of the operation lever 126, is removed, and instead thereof, a dent is made in the front face 127*a* of the central portion, to make the opposite side ends 127*b* and 127*c* project outward (frontward) from the external face of the head part 12, so that the push button 13 can be pushed selectively by selectively pushing the one of the outward projecting side end 127*b* or 127*c*. Other parts thereof are formed similarly to those in the seventh other aspect.

As a result, the operation end of the seesaw type push button is realized. By pushing one of the side end 127*b* or the side end 127*c*, the valving element support members 16*c* and 17*c* of the respective cutoff valves 16 and 17 operate at the same time in the rotation direction of the support shaft 125, which rotates corresponding to the motion of the side end, to open or close the cutoff valves 16 and 17, respectively. In this manner, the same action as that of the lever type can be performed.

[Ninth Other Aspect]

In the above embodiment, the operation portion of the delivery flow switching valve is formed as an operation lever, but the operation portion may be formed as a rotary operation portion.

That is to say, as shown in FIG. 34 and FIG. 35, a rotary delivery flow switching valve 134 is formed in such a manner that the flow path is branched to the shower delivery port 12*a* and the straight delivery port 12*b* by a branching portion 133, from a collecting and transient section 132 provided in a partition member 131.

The flow path of this rotary delivery flow switching valve 134 is formed so that by rotating a screen member 135 forming the shower delivery port 12*a* about the vertical axis by 90 degrees, at the time of delivery from the shower delivery port, the flow path is changed to the shower delivery port 12*a* at the branching portion 133 from the collecting and transient section 132, as shown in FIG. 34, and by rotating the screen member 135 about the vertical axis by 90 degrees from the position of at the time of delivery from the shower delivery port, at the time of straight delivery flow, the flow path of the rotary delivery flow switching valve 134 is not changed at the branching portion 133, and directly reaches the straight delivery port 12*b* as shown in FIG. 35.

The construction of such a rotary delivery flow switching valve 134 is such that it comprises: the screen member 135 forming the shower delivery port 12*a* as well as forming the straight delivery port 12*b* by providing a cylindrical flange portion in the central portion; a flow path changing member 137 engaged with the upper end portion of a cylinder portion 136 forming the straight delivery port 12*b*, which rotates in the same direction as that of the screen member 135, with the rotation of the screen member 135; a partition member 131 which separates a space for housing a sintered magnetic body 19 and a shower delivery flow water accumulation space for accumulating the combination water discharged from the shower, and forming the collecting and transient section 132 in the central portion; and an O-ring 140 provided on the straight delivery flow side of the flow path changing member 137, with the screen member 135 and the flow path changing member 137 being combined and screwed to the collecting and transient section 132, and the screen member 135 and the flow path changing member 137 being assembled rotatably around the axis of the screw 138.

As shown in FIG. 36 and FIG. 37, the screen member 135 is provided with a cylinder portion 136 forming the straight delivery port 12*b* in the central portion of a plate portion 135*a*, which forms the shower delivery port 12*a* having a plurality of small holes drilled therein, and provided with a ring-shaped edge portion 135*b* engaged with the partition member 131 on the outer peripheral edge of the plate portion 135*a* and rotatably mounted to the head part 12. On the inner face of the edge portion 135*b*, there are formed lobes 135*c* protruding towards the center, at four places on the periphery with equal pitch, thereby enabling engagement with a groove engraved on the partition member 131.

At the end portion of the cylinder portion 136 located on the same side with the side where the edge portion 135*b* of the plate portion 135*a* is protruding, there are formed concave portions 136*a* or convex portions 136*b*, so that the same concave and convex portions are located at the axisymmetrically confronting positions, where the end face is divided into four equal parts, and the axially concave and convex portions are formed in two places alternately on the periphery.

The flow path changing member 137 is provided with an internal partition 137*b*, which forms two flow paths in a ring-shaped outer peripheral portion 137*a* intervened between the partition member 131 and the screen member 135, as shown in FIG. 38 and FIG. 39.

The internal partition 137*b* is constructed such that there are formed an axially penetrating bolt hole 137*c* and two holes 137*d* for straight delivery flow at axisymmetrical positions, and on the face abutting on the partition member 131 of the internal partition 137*b*, O-ring grooves 137*e* for fitting an O-ring 140 to be provided around each hole 137*d* are engraved, grooves 137*f* coming off to the side are engraved at positions rotated by 90 degrees from each hole 137*d*, and holes 137*g* penetrating the wall face are formed on the side of the corresponding outer peripheral portion 137*a*, so that combination water can flow out to the side from the grooves 137*f* via the holes 137*g*.

In the internal partition 137*b*, there are formed concave portions 137*h*, which have concave and convex portions at positions opposite to those of the grooves 137*f*, at positions where the grooves 137*f* are not formed on the face on the downstream side, so that concave portions 136*a* and the convex portions 136*b* of the cylinder portion 136 provided in the screen member 135 can be fitted thereto.

The partition member 131 is formed, as shown in FIG. 40 and FIG. 41, in a shape having cylindrical fitting portions 131*b* and 131*c* respectively projected towards the both sides of a disc 131*a* on the outer periphery thereof. A ring-shaped lobe 131*d* is provided with the height thereof being adjusted so that in the case where the sintered magnetic body 19 is placed on the face on the upstream side of the disc 131*a*, there is a predetermined gap, and the collecting and transient section 132 protruding to the downstream side is formed in the central portion of the disc 131*a*.

The collecting and transient section 132 comprises a screw hole 132*a* having a cylindrical external face, and formed on the downstream side of the central portion without penetrating through to the upstream side (or a hole formed in a smaller size so as to be secured by screwing a screw 138), a ring-shaped groove 132*b* formed from the upstream side on the outer peripheral side of the screw hole 132*a* so that the combination water having passed through the sintered magnetic body 19 can flow in, and two through holes 132*c* formed in a fan shape, one each at a position axisymmetrical with respect to the center, corresponding to the groove 132*b*.

The concave portions 136*a* and the convex portions 136*b* of the cylinder portion 136 provided in the screen member 135 are fitted to the backside of the groove 137*f* and the concave portion 137*h* of the flow path changing member 137, in the collecting and transient section 132 provided in this partition member 131, so that the screen member 135 and the flow path changing member 137 are assembled rotatably with respect to the partition member 131 with the screw 138. As a result, changeover between the straight delivery flow and the shower delivery flow can be done, by holding the outer peripheral face of the screen member 135 and rotating it about the axis of the screw 138.

[Tenth Other Aspect]

In the above embodiment, the shower head 10 is connected to the flexible hose 3 connected to the combination taps 2, but the construction may be such that there is no hose 3, and the shower head 10 is directly connected to the combination taps 2.

In this case, for example, as shown in FIG. 42, a delivery port 62*a* of combination taps 62 is formed to have a thicker diameter than that of the hose connecting portion 11*f* formed in the holding part 11 of the shower head 10, and a direct connection adapter 151 is fitted to a hose mounting screw lid formed in the hose connecting portion 11*f*, and the direct connection adapter 151 is inserted into the delivery port 62*a* of the shower head 10, to thereby connect the shower head 10 to the combination taps 62 directly.

The direct connection adapter 151 has a gasket groove 151*a* engraved on the inside thereof so that a sealing gasket 152 can be intervened between the hose connecting portion 11*f* and the direct connection adapter 151, and an O-ring groove 151*b* on the outside thereof, to which a sealing O-ring 153 is fitted. At the position on the shower head side of the place where the O-ring groove is engraved, a plurality of screw insertion holes 151*c* for fixing the position are engraved on the circumference with an equal pitch.

The delivery port 62*a* has a screw hole 62*b* for fixing the position of the shower head engraved thereon. In the case of connecting the shower head 10 to the combination taps 62, a screw 63 is screwed into the screw hole 62*b*, and the point of the screw 63 is inserted into the screw insertion hole 151*c* provided on the direct connection adapter 151, so that the shower head 10 directly mounted to the delivery port 62*a* is prevented from rotating about the axis or coming off.

As a result, the shower head 10 directly mounted to the combination taps 62 can be used in the same manner as the faucet.

[Eleventh Other Aspect]

In the above embodiment, the shower head 10 is connected to the combination taps 2 or 62, but it may be connected to a single tap for discharging only hot water or water, instead of the combination taps 2 or 62.

For example, as shown in FIG. 43, the shower head 10 is connected to a flexible hose 74 connected to a single tap 73 for water, and held detachably to a holder section 75 in the same manner as in the embodiment.

As a result, by the operation of a lever 73*a* provided on the single tap 73, discharging or stopping water is changed over by moving the lever 73*a* up and down, and the quantity of discharged water is adjusted by moving the lever 73*a* to the left or right. Moreover, as required, the shower head 10 is taken out from the holder section 75, to discharge water at an optional position within the range where the hose 74 can reach.

Description of the Reference Numerals

| | |
|---|---|
| 1 | sink |
| 2, 5, 62 | combination tap |
| 3, 74 | hose |
| 4, 5a, 75 | holder section |
| 10 | shower head |
| 11 | holding part |
| 11a | cylinder portion |
| 11b | cylinder portion |
| 11c | threaded portion |
| 11d | hose fixing screw |
| 11e | cartridge accepting portion |
| 11f | hose connecting portion |
| 12 | head part |
| 12a | shower delivery port |
| 12b | straight delivery port |
| 12c, 12d, 131 | partition member |
| 12e, 12f | support shaft |
| 13 | push button |

-continued

| Description of the Reference Numerals | |
|---|---|
| 13a | switching shaft |
| 13b | switching ring |
| 13c | first switching frame |
| 13d | second switching frame |
| 14 | switching lever |
| 15, 111 | water quality purification cartridge |
| 15a, 15k | water quality purification material |
| 15b, 15c | non-woven fabric |
| 15d, 15j | germicidal ceramic |
| 15e, 15f, 15g, 15l, 15m | cap |
| 15h, 15r | O-ring |
| 15i | filtering material |
| 15n, 15p | hole |
| 15q | O-ring groove |
| 16 | cutoff valve |
| 16a, 17a | valve seat |
| 16b, 17b | valving element |
| 16c, 17c | valving element supporting material |
| 16d, 17d | coil spring |
| 17 | cutoff valve |
| 18, 118 | collecting portion |
| 19 | sintered magnetic body |
| 20 | spring part |
| 21 | outer peripheral flow path |
| 22 | central space |
| 23 | flow path |
| 24 | flow path |
| 25, 132 | transient section |
| 26 | delivery flow switching valve |
| 26a | valving element |
| 26b | shaft portion |
| 31 | push rod |
| 32 | bottom |
| 33 | plate-like support member |
| 34 | claw member |
| 35 | guide member |
| 36 | cylinder portion |
| 36a | groove |
| 36b | slope |
| 37 | guard portion |
| 38 | claw |
| 41 | thin shaft |
| 42 | thick shaft |
| 43 | rib |
| 43a | slope |
| 44 | cylindrical member |
| 44a | concave portion |
| 45 | rib |
| 46 | push rod insertion hole |
| 47 | plate portion |
| 48 | cylinder portion |
| 49 | hole |
| 50 | notch |
| 51 | push rod insertion hole |
| 52, 57, 140, 153 | O-ring |
| 53 | coil spring |
| 55 | protruding cylinder portion |
| 56 | O-ring groove |
| 62 | combination tap |
| 62a | delivery port |
| 63 | screw |
| 73 | single tap |
| 111a | cartridge case |
| 113 | raw water flow path |
| 114 | cartridge accepting portion |
| 114a, 114b | partition wall |
| 115, 116 | flow path space |
| 115a, 115b, 116b | communicating passage |
| 116a | hole |

-continued

| Description of the Reference Numerals | |
|---|---|
| 117 | flow path |
| 121, 122 | partition plate |
| 122a | cylindrical member |
| 123 | raw water flow path |
| 124 | concave portion |
| 125 | support shaft |
| 125a, 125b | bearing |
| 126 | operation lever |
| 126a | base |
| 126b | operation end |
| 127 | seesaw type push button |
| 127a | front face |
| 127b, 127c | opposite side end |
| 133 | branching portion |
| 134 | rotary delivery flow switching valve |
| 135 | screen member |
| 136 | cylinder portion |
| 137 | flow path changing member |
| 138 | screw |
| 151 | direct connection adapter |
| 152 | sealing gasket |
| 361 | axially shallow groove |
| 362 | axially deep groove |

The invention claimed is:

1. A water quality purification cartridge comprising:

a water quality purification material of cylindrical shape, an outer diameter thereof being smaller than an inner diameter of a holding part for the cartridge, an end portion at a downstream side of the water quality purification material provided with a portion fitting into a cartridge accepting portion of the holding part, the water quality purification material having a central hole which opens at said end portion;

said central hole is provided concentrically with a central axis of the water quality purification material, and an end portion at an upstream side of the water quality purification material is closed;

a filtering material provided on an outer periphery of the water quality purification material; and a germicidal ceramic arranged along an end surface of the downstream side of the water quality purification material;

a first cap having a water quality purification material downstream side supporting wall having a hole serving as a fluid flow path drilled in a cylindrical central part thereof; and said germicidal ceramic is stored in an internal space of a cylinder provided by a second cap, which connects two cylinders having a different diameter from the first cap.

2. A water quality purification cartridge according to claim 1, wherein said water quality purification material is stored in a space provided by a third cap formed in a cylindrical shape having a bottom, and said first cap forming a fitting portion with the third cap.

3. A water quality purification cartridge according to claim 1 or 2, wherein said germicidal ceramic is clamped between first non-woven fabrics and second non-woven fabrics.

* * * * *